(12) United States Patent
Boissonneault et al.

(10) Patent No.: US 11,300,523 B2
(45) Date of Patent: Apr. 12, 2022

(54) SENSOR ASSEMBLY FOR MOVING ITEMS AND RELATED FILLING MACHINE AND METHODS

(71) Applicant: Blue Sky Ventures (Ontario) Inc., Toronto (CA)

(72) Inventors: Steve Boissonneault, Saint-Hippolyte (CA); Luc Jalbert, Boisbriand (CA); Alexandre Lebel, Laval (CA); François Robichaud, Repentigny (CA); Guillaume Chabot-Nobert, Verdun (CA)

(73) Assignee: BLUE SKY VENTURES (ONTARIO) INC., Toronto (CA)

( * ) Notice: Subject to any disclaimer, the term of this patent is extended or adjusted under 35 U.S.C. 154(b) by 199 days.

(21) Appl. No.: 16/837,205

(22) Filed: Apr. 1, 2020

(65) Prior Publication Data

US 2020/0319117 A1    Oct. 8, 2020

Related U.S. Application Data

(60) Provisional application No. 62/915,863, filed on Oct. 16, 2019, provisional application No. 62/829,835, filed on Apr. 5, 2019.

(51) Int. Cl.
*G01N 21/89* (2006.01)
*B65B 57/14* (2006.01)
(Continued)

(52) U.S. Cl.
CPC ............. *G01N 21/89* (2013.01); *B65B 57/14* (2013.01); *B65G 43/08* (2013.01); *G01D 5/342* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,206,062 A | * | 9/1965 | Rappaport | ............. B65B 5/103 221/7 |
| 3,549,008 A | | 12/1970 | Anderson | |

(Continued)

FOREIGN PATENT DOCUMENTS

| | | |
|---|---|---|
| CA | 2982006 A1 | 10/2016 |
| CA | 2799058 C | 1/2017 |

(Continued)

OTHER PUBLICATIONS

Canadian Intellectual Property Office, International Search and Written Opinion of the International Searching Authority, International Application No. PCT/IB2020/053102, 13 pages (dated Jul. 7, 2020).

*Primary Examiner* — Kyle O Logan
(74) *Attorney, Agent, or Firm* — Thompson Hine LLP

(57) ABSTRACT

A sensor system for evaluating an item as it moves includes a sensor assembly including a plurality of emitters and a plurality of detectors disposed about an item movement path. A controller is configured for selectively operating the sensor assembly to set up a first active detection pattern through the item movement path by sequentially and rapidly checking an occlusion status of each of a first plurality of emitter to detector light paths that make up the first active detection pattern, such that only one emitter to detector light path of the first plurality of emitter to detector light paths is checked for occlusion at a given instance.

22 Claims, 29 Drawing Sheets

(51) Int. Cl.
  *B65G 43/08* (2006.01)
  *G01D 5/34* (2006.01)

(56) References Cited

U.S. PATENT DOCUMENTS

| | | | |
|---|---|---|---|
| 3,631,255 A | 12/1971 | Gender et al. | |
| 3,805,061 A | 4/1974 | De Missimy et al. | |
| 3,880,289 A | 4/1975 | Gray | |
| 3,914,601 A | 10/1975 | Hoover et al. | |
| 4,147,619 A | 4/1979 | Wassmer et al. | |
| 4,157,468 A | 6/1979 | Primiano | |
| 4,205,973 A | 6/1980 | Ryan | |
| 4,207,985 A | 6/1980 | Lockett et al. | |
| 4,266,124 A | 5/1981 | Weber et al. | |
| 4,350,442 A | 9/1982 | Arild et al. | |
| 4,373,638 A | 2/1983 | Schapper | |
| 4,666,045 A | 5/1987 | Gillespie et al. | |
| 4,699,273 A | 10/1987 | Suggi-Liverani et al. | |
| 4,718,558 A | 1/1988 | Castaneda | |
| 4,863,041 A | 9/1989 | Bailey | |
| 4,946,045 A | 8/1990 | Ditchburn et al. | |
| 5,077,477 A | 12/1991 | Stroman et al. | |
| 5,130,532 A * | 7/1992 | Clemens | G01V 8/20 250/221 |
| 5,148,923 A | 9/1992 | Fraenkel et al. | |
| 5,184,732 A | 2/1993 | Ditchburn et al. | |
| 5,209,355 A | 5/1993 | Mindermann | |
| 5,236,092 A | 8/1993 | Krotkov et al. | |
| 5,353,937 A | 10/1994 | Childress | |
| 5,448,363 A | 9/1995 | Hager | |
| 5,522,512 A | 6/1996 | Archer et al. | |
| 5,562,214 A | 10/1996 | Castañeda et al. | |
| 5,583,334 A | 12/1996 | Baumann | |
| 5,638,657 A | 6/1997 | Archer et al. | |
| 5,703,784 A | 12/1997 | Pearson | |
| 5,779,058 A * | 7/1998 | Satake | B07C 5/3425 209/581 |
| 5,819,953 A | 10/1998 | Julius et al. | |
| 5,865,990 A | 2/1999 | Novak et al. | |
| 5,954,206 A | 9/1999 | Mallon et al. | |
| 6,191,859 B1 | 2/2001 | Winterbottom et al. | |
| 6,363,687 B1 | 4/2002 | Luciano et al. | |
| 6,378,572 B1 * | 4/2002 | Neubauer | B65B 5/103 141/94 |
| 6,380,503 B1 * | 4/2002 | Mills | B07C 5/10 209/579 |
| 6,516,969 B2 | 2/2003 | Tamaoki | |
| 6,592,005 B1 * | 7/2003 | Coughlin | B25J 15/0206 221/129 |
| 6,629,611 B2 * | 10/2003 | Satake | B07C 5/3425 198/439 |
| 6,639,167 B1 * | 10/2003 | Bjork | B07C 5/12 198/751 |
| 6,784,996 B2 | 8/2004 | Ikeda et al. | |
| 7,081,713 B2 | 7/2006 | Jürs et al. | |
| 7,100,581 B2 | 9/2006 | Ricco et al. | |
| 7,107,741 B2 | 9/2006 | Monti | |
| 7,242,017 B2 | 7/2007 | Arnold et al. | |
| 7,298,870 B2 | 11/2007 | Ikeda et al. | |
| 7,315,929 B2 | 1/2008 | Barth et al. | |
| 7,339,660 B1 | 3/2008 | Cohn et al. | |
| 7,355,140 B1 | 4/2008 | Afsari | |
| 7,392,640 B2 | 7/2008 | Vasquali | |
| 7,438,201 B2 * | 10/2008 | Kim | B65B 5/103 221/200 |
| 7,480,038 B2 | 1/2009 | Cohn et al. | |
| 7,656,520 B2 | 2/2010 | Cohn et al. | |
| 7,878,366 B2 | 2/2011 | Cicognani | |
| 7,956,623 B2 | 6/2011 | Bassani et al. | |
| 7,968,814 B2 | 6/2011 | Imai et al. | |
| 8,102,170 B2 | 1/2012 | Monti | |
| 8,220,657 B2 | 7/2012 | Cicognani | |
| 8,285,029 B2 | 10/2012 | Paul et al. | |
| 8,373,081 B2 | 2/2013 | Ackley et al. | |
| 8,386,073 B2 | 2/2013 | Kim | |
| 8,393,495 B2 | 3/2013 | Kim | |
| 8,417,375 B2 | 4/2013 | Horev et al. | |
| 8,436,268 B1 | 5/2013 | Afsari et al. | |
| 8,464,899 B2 | 6/2013 | Clarke et al. | |
| 8,662,312 B2 | 3/2014 | Ito et al. | |
| 8,700,208 B2 | 4/2014 | Kim | |
| 8,770,413 B2 | 7/2014 | Ackley et al. | |
| 8,794,483 B2 | 8/2014 | Czarnek | |
| 8,827,112 B2 | 9/2014 | Yuyama et al. | |
| 8,833,566 B2 | 9/2014 | Ito et al. | |
| 8,839,988 B2 | 9/2014 | Yuyama et al. | |
| 8,917,100 B2 | 12/2014 | Monti | |
| 8,924,008 B2 | 12/2014 | Yuyama et al. | |
| 8,984,844 B2 | 3/2015 | Shall | |
| 8,985,342 B2 | 3/2015 | Tanaka | |
| 8,985,389 B2 | 3/2015 | Yuyama et al. | |
| 9,063,096 B2 | 6/2015 | Gertitschke | |
| 9,072,652 B1 | 7/2015 | Balasubramanian et al. | |
| 9,085,380 B2 | 7/2015 | Monti | |
| 9,097,359 B2 | 8/2015 | Ito et al. | |
| 9,101,962 B2 | 8/2015 | Ackley et al. | |
| 9,233,789 B2 | 1/2016 | Koike et al. | |
| 9,251,493 B2 | 2/2016 | Jacobs et al. | |
| 9,259,766 B2 | 2/2016 | Ackley et al. | |
| 9,274,510 B2 | 3/2016 | Burger et al. | |
| 9,296,019 B2 | 3/2016 | Berghmans et al. | |
| 9,364,397 B2 | 6/2016 | Shibasaki et al. | |
| 9,468,948 B2 | 10/2016 | Ackley et al. | |
| 9,492,849 B2 | 11/2016 | Adams et al. | |
| 9,717,652 B2 | 8/2017 | Geboers | |
| 9,839,583 B2 | 12/2017 | Kim | |
| 10,500,131 B2 | 12/2019 | Jacobs | |
| 2003/0034282 A1 | 2/2003 | Safai | |
| 2006/0016735 A1 | 1/2006 | Ito et al. | |
| 2006/0271237 A1 | 11/2006 | Kim | |
| 2009/0056825 A1 | 3/2009 | Mertens et al. | |
| 2013/0056398 A1 | 3/2013 | Adams et al. | |
| 2013/0092592 A1 | 4/2013 | Singer | |
| 2013/0134071 A1 | 5/2013 | Singer | |
| 2014/0061103 A1 | 3/2014 | Ito et al. | |
| 2015/0120039 A1 | 4/2015 | Nishibue | |
| 2016/0250665 A1 | 9/2016 | Lampe | |
| 2017/0008036 A1 | 1/2017 | Ackley et al. | |
| 2017/0224585 A1 | 8/2017 | Jacobs | |
| 2017/0296435 A1 | 10/2017 | Ziv et al. | |
| 2018/0255698 A1 | 9/2018 | Körösi et al. | |

FOREIGN PATENT DOCUMENTS

| | | |
|---|---|---|
| CA | 2792507 C | 5/2018 |
| CA | 2957202 C | 4/2019 |
| EP | 1728718 B1 | 5/2010 |
| EP | 2200560 B1 | 1/2014 |
| EP | 2436362 B1 | 3/2014 |
| EP | 2569713 B1 | 11/2015 |
| EP | 2862558 B1 | 1/2017 |
| EP | 2676654 B1 | 3/2017 |
| EP | 2545522 B1 | 7/2017 |
| EP | 3125853 B1 | 6/2018 |
| WO | 2016/022158 A1 | 2/2016 |
| WO | 2016/132281 A1 | 8/2016 |
| WO | 2018/164099 A1 | 9/2018 |
| WO | 2018/211540 A1 | 11/2018 |

* cited by examiner

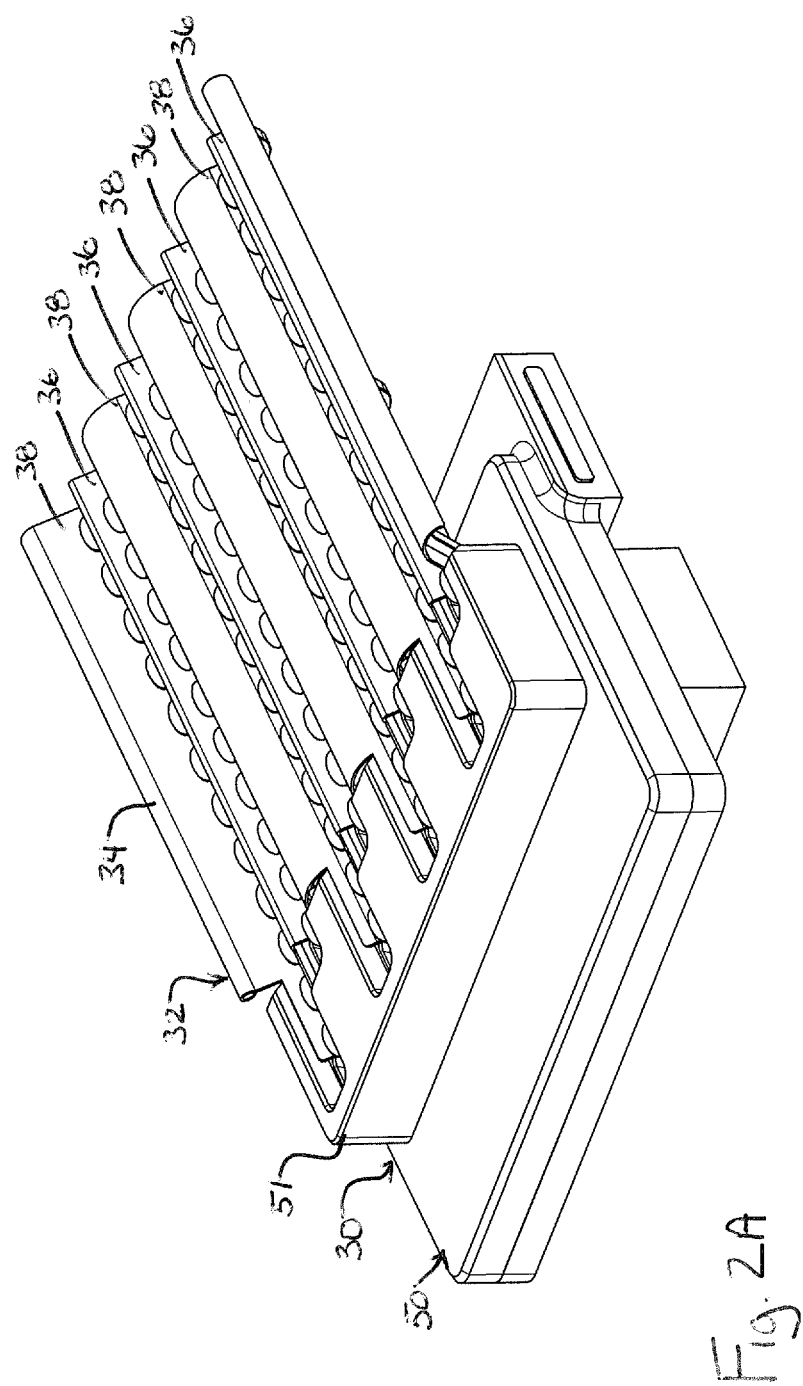

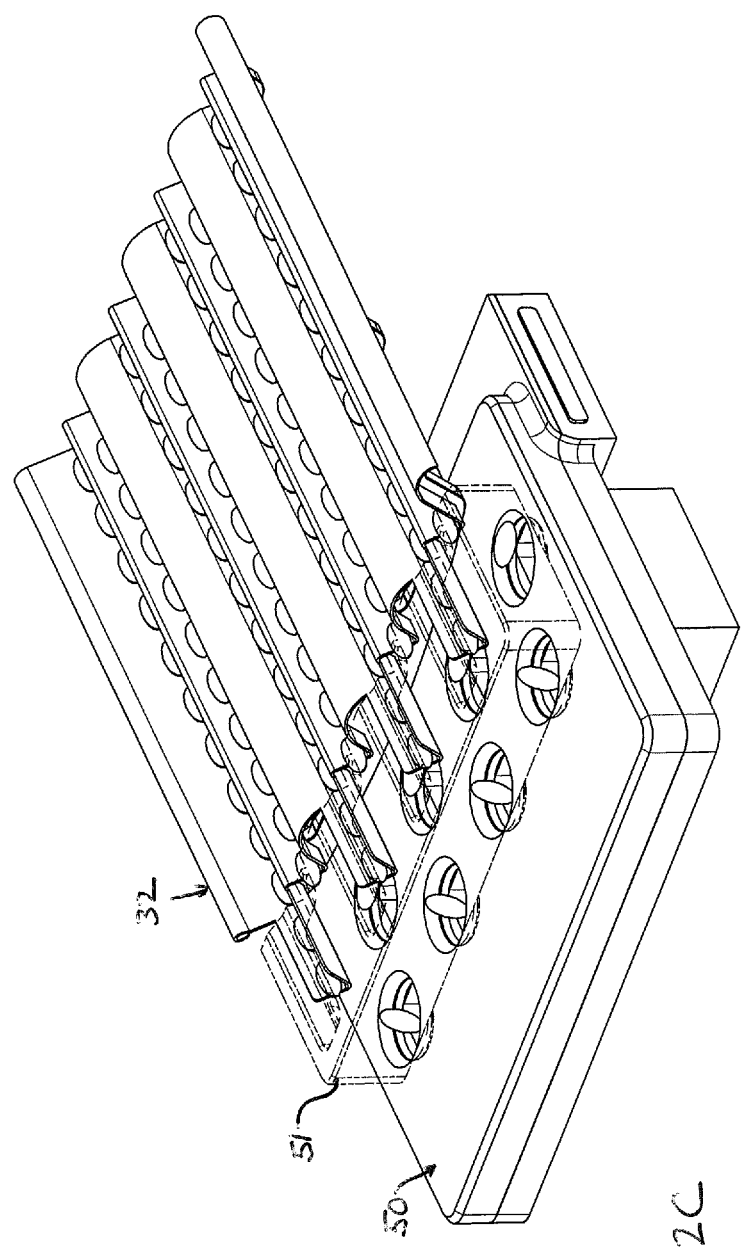

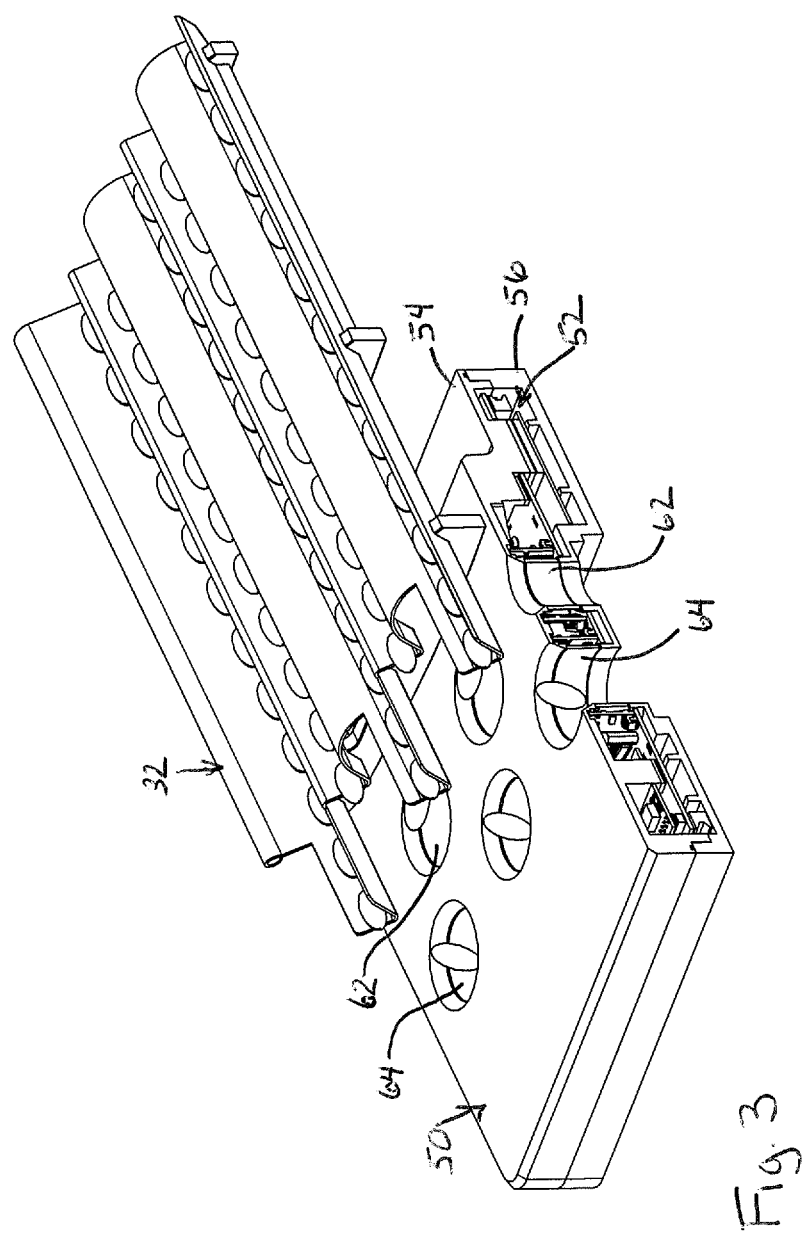

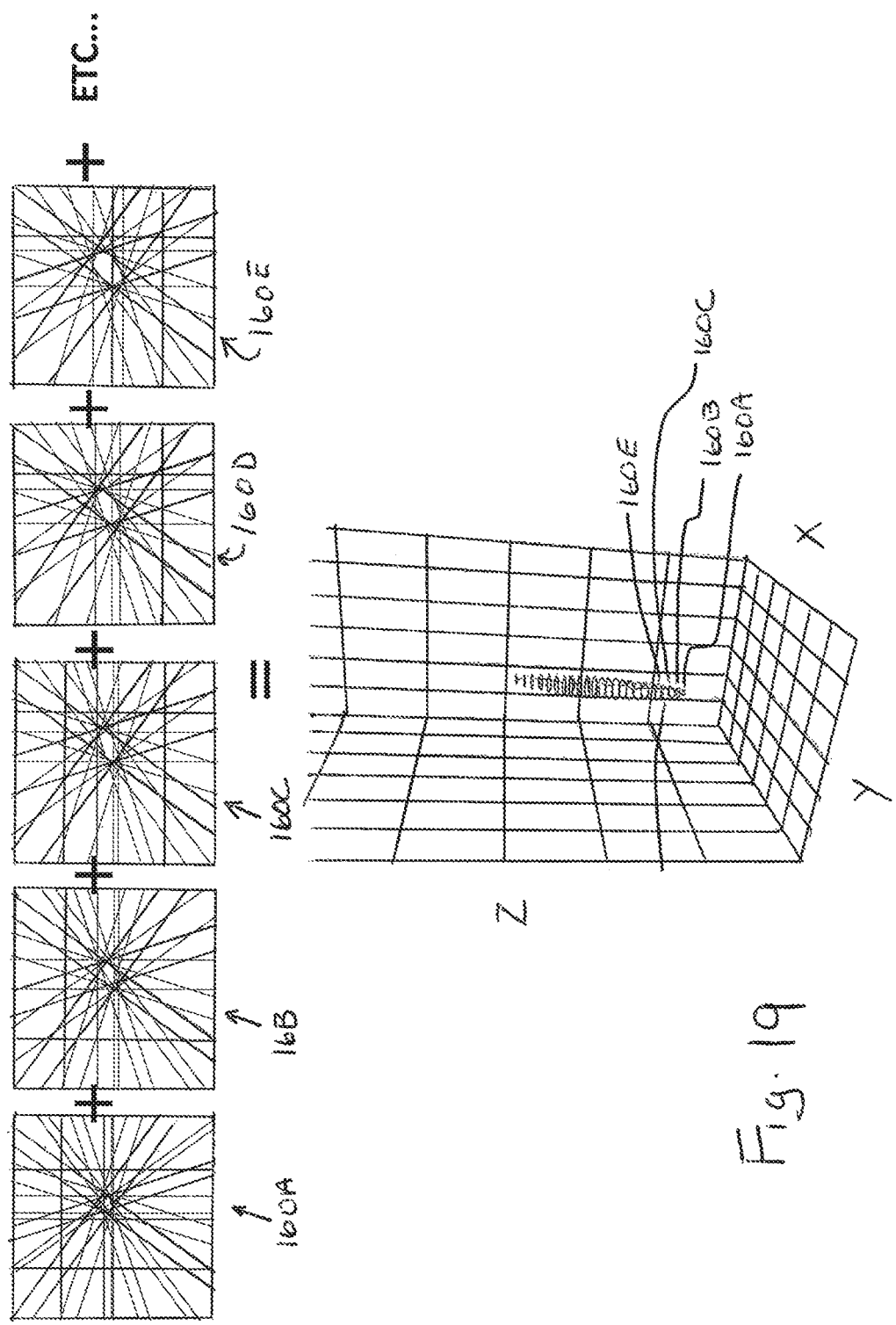

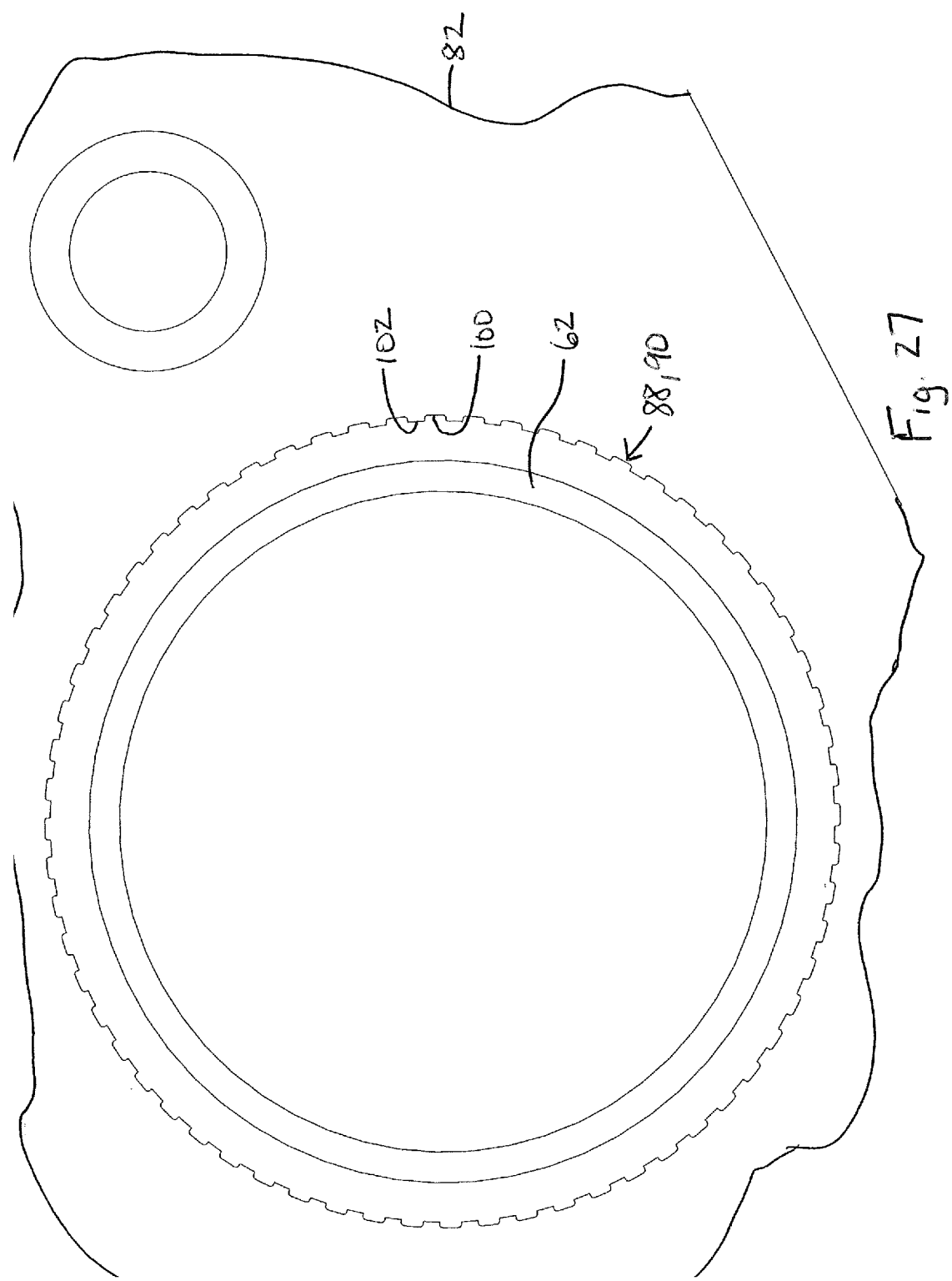

SENSOR ASSEMBLY FOR MOVING ITEMS AND RELATED FILLING MACHINE AND METHODS

TECHNICAL FIELD

This application relates generally to sensor systems for evaluating items and, more specifically, to a sensor assembly used for evaluation of moving items, such as falling items, as may be used in filling machines in which items are being checked, counted and grouped for purposes of filling a container or package with a set number of the items.

BACKGROUND

In the packaging of bulk items, such as pharmaceutical tablets or capsules, the items must be counted and grouped in order to fill containers, packages or other receptacles with a desired number of the items. In some applications it is also desirable to evaluate each bulk item for conformity to an expected standard. Achieving desired count and evaluation while at the same time achieving high speed filling is critical, and therefore improvements to filling machines are continuously sought, including improvements to the item sensing systems utilized in filling machines.

SUMMARY

In one aspect, a sensor system for evaluating an item as it moves includes a sensor assembly including a plurality of emitters and a plurality of detectors disposed about an item movement path. A controller is configured for selectively operating the sensor assembly to set up a first active detection pattern through the item movement path by sequentially and rapidly checking an occlusion status of each of a first plurality of emitter to detector light paths that make up the first active detection pattern, such that only one emitter to detector light path of the first plurality of emitter to detector light paths is checked for occlusion at a given instance.

In another aspect, a sensor system for evaluating falling items includes a sensor assembly including a plurality of emitters and a plurality of detectors disposed about an item drop path, wherein the plurality of emitters comprises at least forty emitters and the plurality of detectors comprises at least forty detectors, wherein the plurality of emitters and the plurality of detectors are arranged in an alternating sequence about the item drop path. A controller is configured for selectively operating the sensor assembly to capture an emitter to detector path occlusion data slice for an item as it falls through the drop path. The emitter to detector path occlusion data slice is captured by: establishing a first active detection pattern through the item movement path by sequentially and rapidly checking an occlusion status of each of a first plurality of substantially parallel emitter to detector light paths that make up the first active detection pattern and establishing a second active detection pattern through the item movement path by sequentially and rapidly checking an occlusion status of each of a second plurality of substantially parallel emitter to detector light paths that make up the second active detection pattern, wherein the second active detection pattern is angularly rotated relative to the first active detection pattern. The controller is configured to evaluate both the first active detection pattern and the second active detection pattern to identify whether more than one item is falling through a detection plane of the sensor assembly at the same time.

In a further aspect, a sensor system for evaluating an item as it moves includes a sensor assembly including a plurality of emitters and a plurality of detectors disposed about an item movement path. A controller is configured for selectively operating the sensor assembly in a calibration mode when no item is within a sense zone of the sensor assembly. In the calibration mode, for at least one emitter to detector light path, the controller is configured to: activate an emitter of the emitter to detector light path at a set intensity level and check a detector of the emitter to detector light path for a detector signal strength and, if the detector signal strength is outside of a predefined signal strength range, the controller adjusts the set intensity level in a manner expected to bring detector signal strength within the predefined signal strength range.

In yet another aspect, a filling device for filling receptacles with a plurality of items includes an item conveyor including a plurality of item feed paths arranged above a corresponding plurality of item drop paths, wherein each item feed path includes a distal end at which items drop from the item feed path into an aligned one of the item drop paths. Each item drop path includes a respective item sensor system positioned therealong for sensing falling items. The plurality of item feed paths include a plurality of first item feed paths and a plurality of second item feed paths, wherein the plurality of first item feed paths have distal ends that are substantially aligned along a first drop plane, wherein the plurality of second item feed paths have distal ends that are substantially aligned along a second drop plane, wherein the second drop plane is offset from the first drop plane, wherein the plurality of first item feed paths and the plurality of second item feed paths are arranged in an alternating sequence across a width of the conveyor.

In yet another aspect, a sensor system for evaluating moving items includes a sensor assembly including a first plurality of emitters and detectors disposed about a first item movement path. The first plurality of emitters and detectors are mounted about a first printed circuit board opening along the first item movement path.

In yet another aspect, a sensor system for evaluating moving items includes a sensor assembly including a sensor compartment including a plurality of item movement paths therethrough. Each item movement path: (i) being defined at least in part by a respective cylindrical wall; and (ii) having a plurality of emitters and detectors disposed within the compartment and around the cylindrical wall of the item movement path, the emitters oriented to emit light through the cylindrical wall and into the item movement path, the detectors oriented to detect light that passes through the cylindrical wall from the item movement path.

The details of one or more embodiments are set forth in the accompanying drawings and the description below. Other features, items, and advantages will be apparent from the description and drawings, and from the claims.

BRIEF DESCRIPTION OF THE DRAWINGS

FIGS. 2A-2C are partial perspective view of an item feed and item sensor assembly of a filling machine, where FIG. 2A shows all components, FIG. 2B shows an infeed cover removed and FIG. 2C shows the infeed cover as transparent;

FIG. 3 is a cross-section of FIG. 2B;

FIG. 19 depicts how multiple detection data splice item perimeter determinations can be combined to approximate a volume of the item;

FIG. 27 shows another printed circuit board configuration adapted for edge mounting of emitters and detectors;

DETAILED DESCRIPTION

Figure 1:
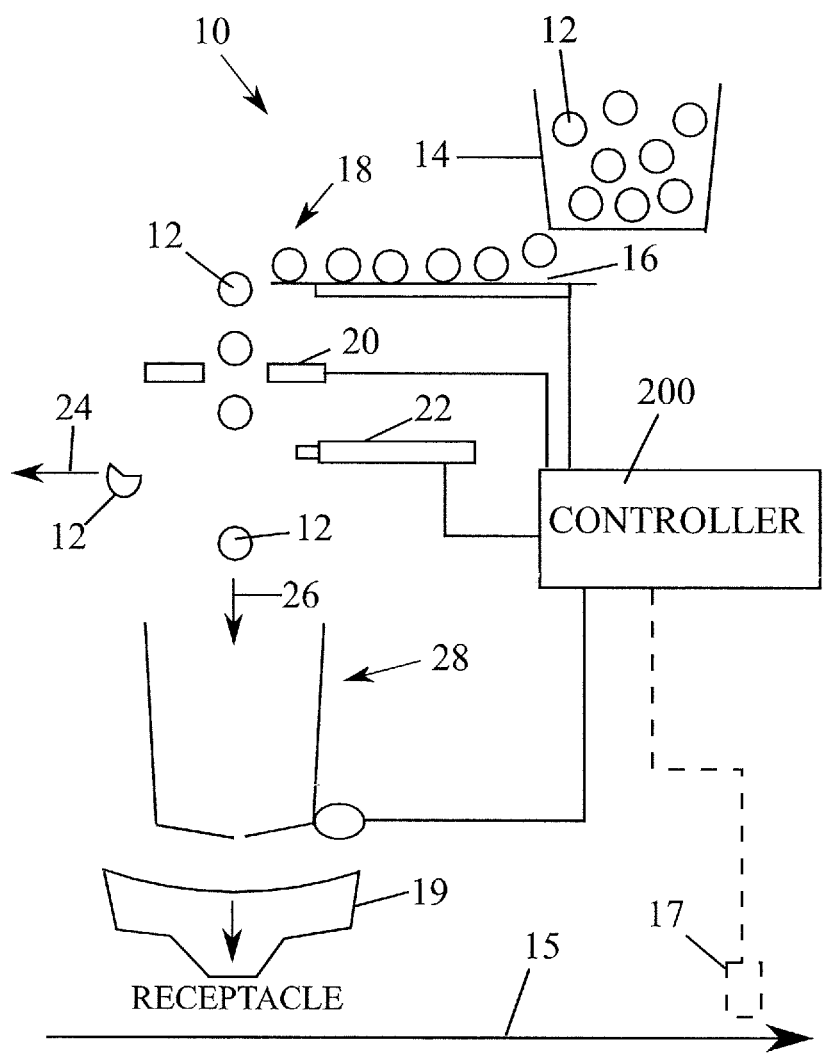
FIG. 1 is schematic side elevation of a filling machine.
Figure 2B:
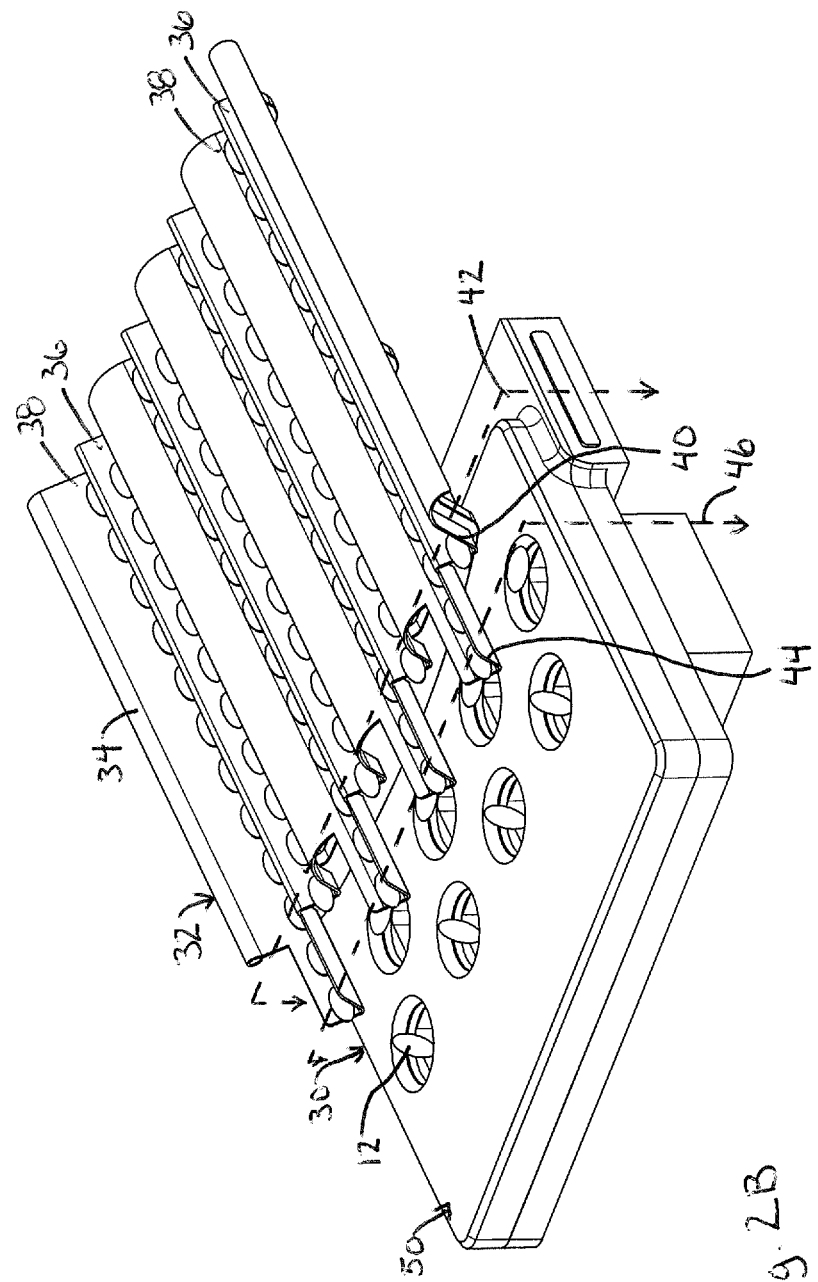
Figure 4:
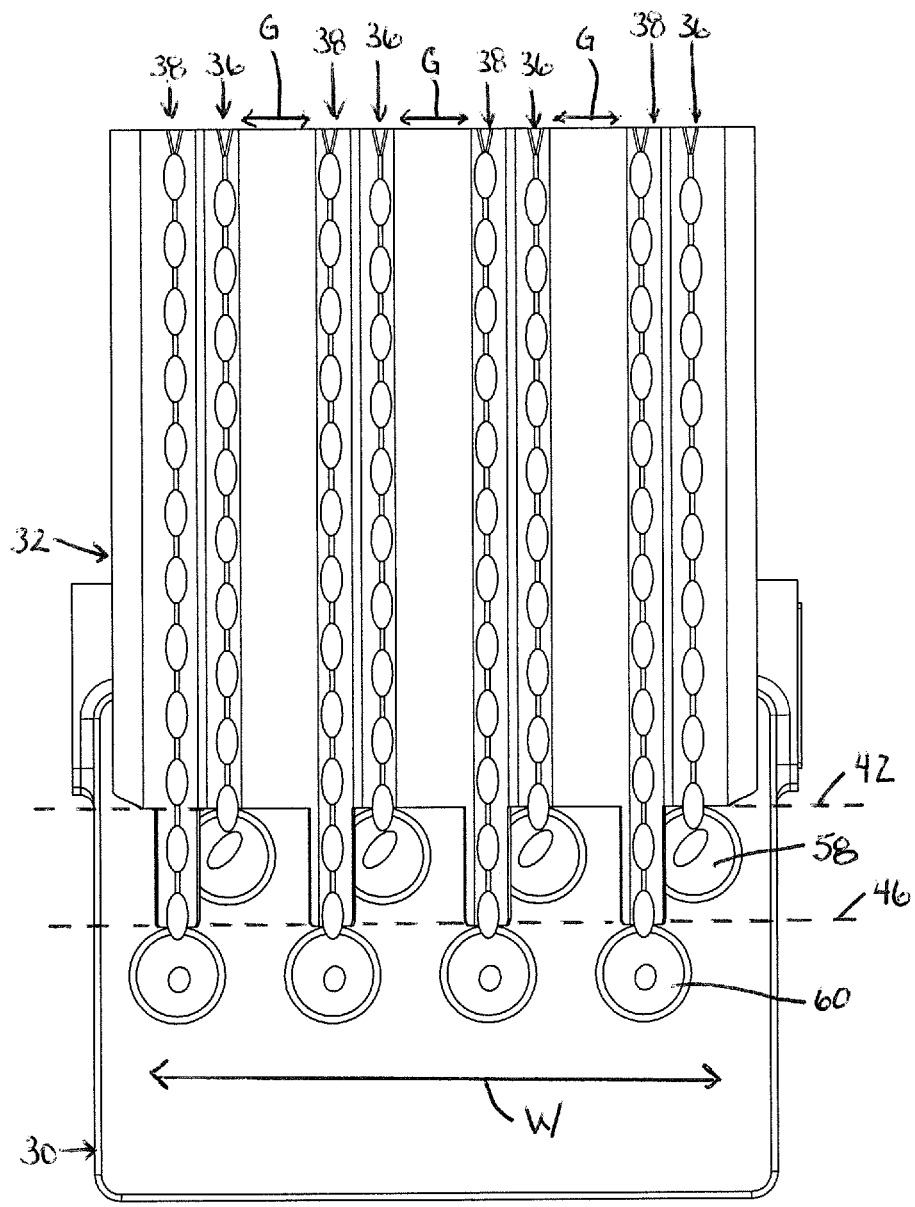
FIG. 4 is a top plan view of FIG. 2.
Figure 5:
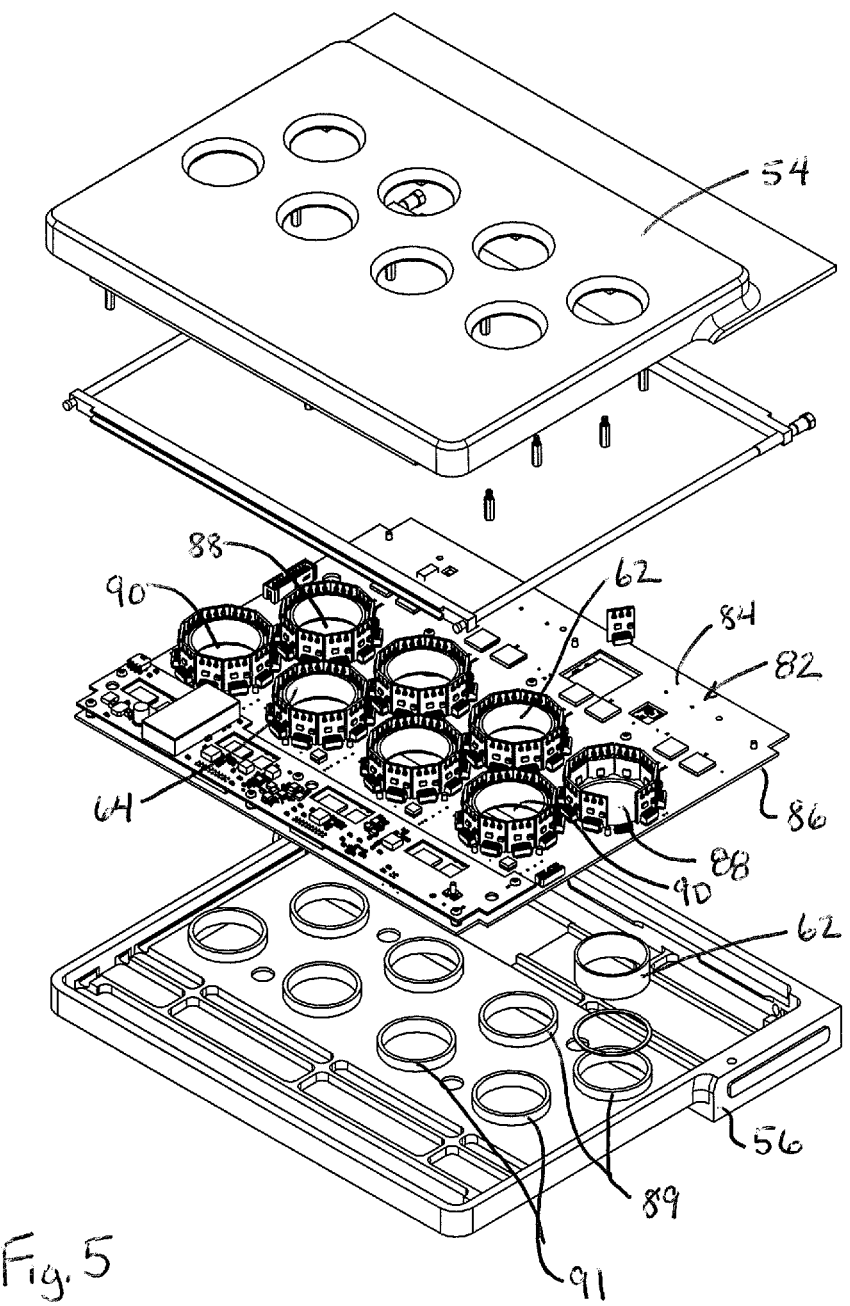
FIG. 5 is an exploded perspective view of the sensor assembly of FIG. 2.
Figure 6:
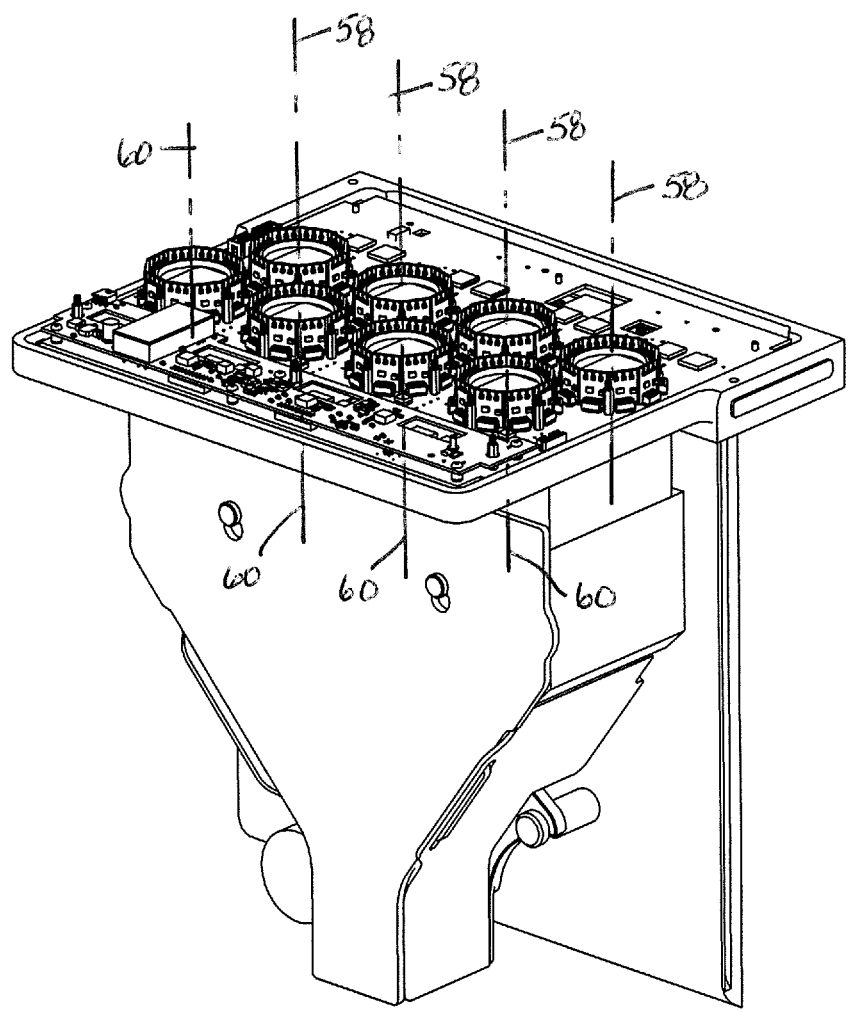
FIG. 6 is a partial perspective of one printed circuit board and cylinder arrangement of the sensor assembly.
Figure 7:
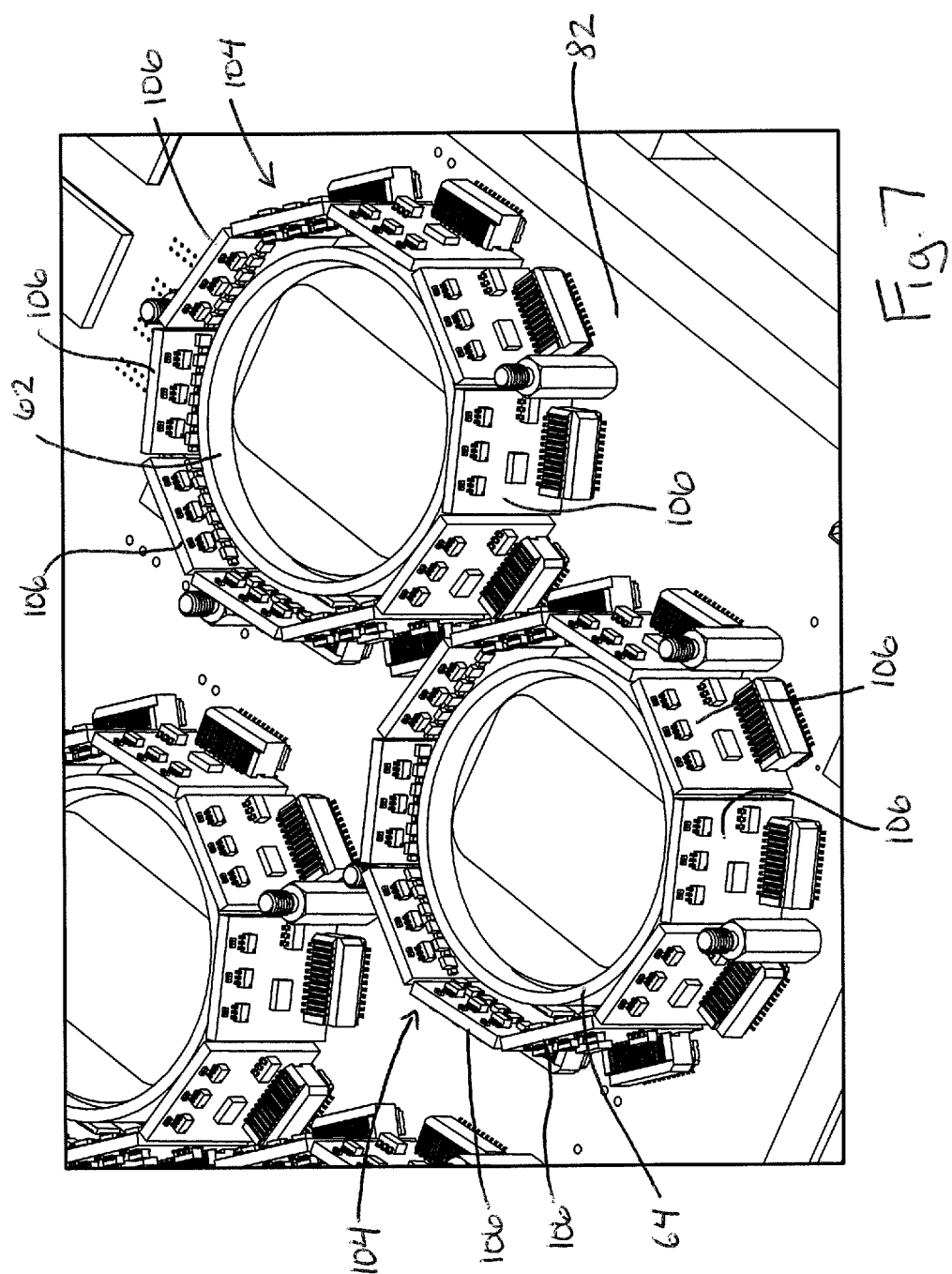
FIG. 7 is a partial perspective of FIG. 6.
Figure 8:
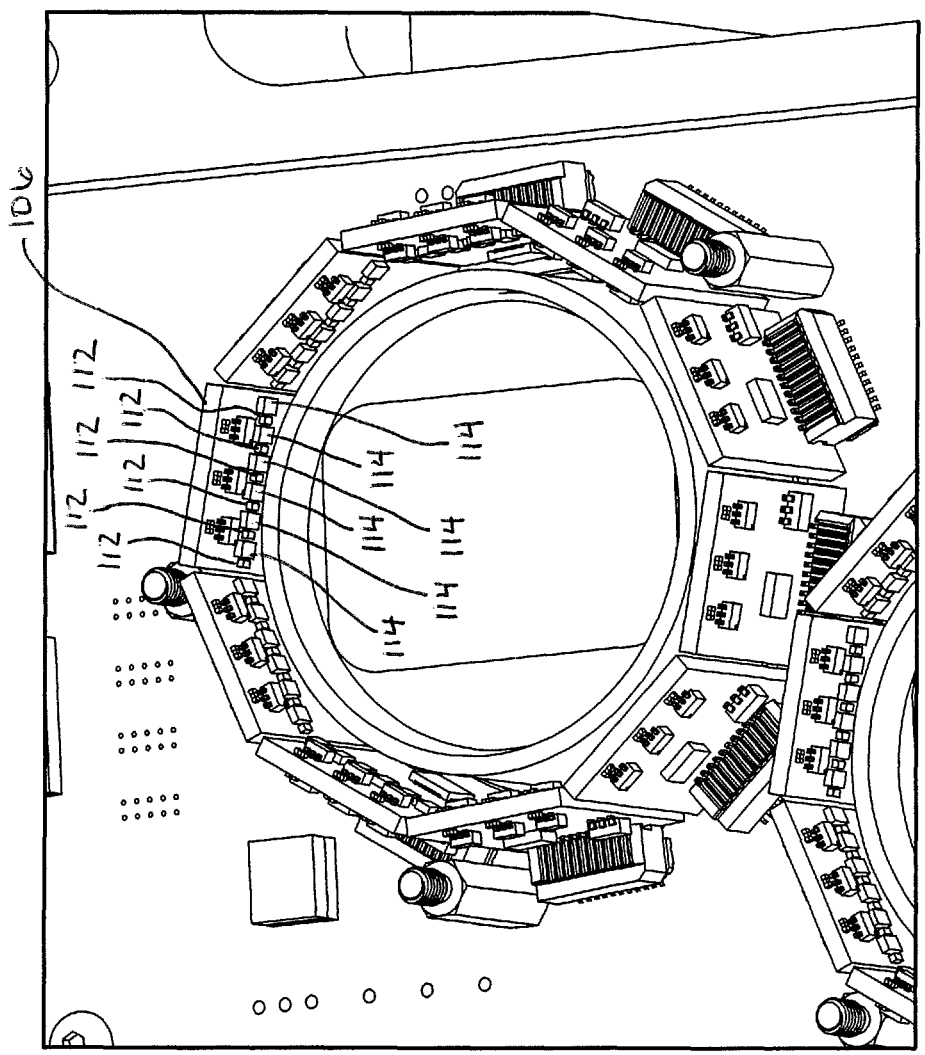
FIG. 8 is a partial perspective of FIG. 6.
Figure 9:
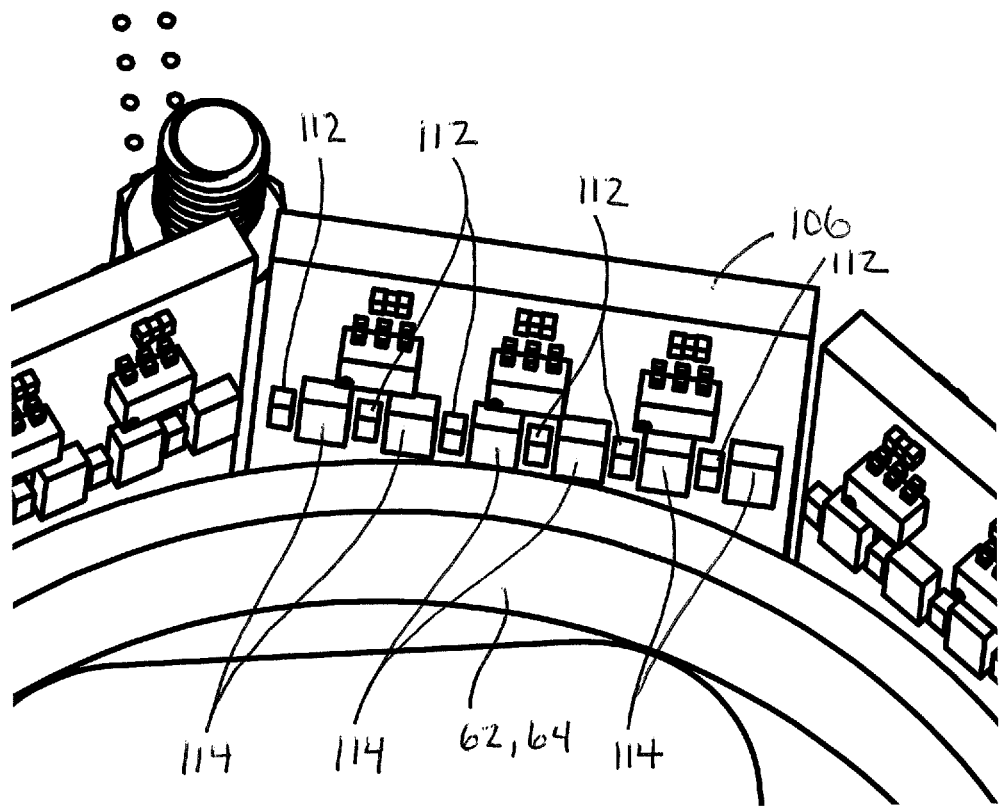
FIG. 9 is a partial perspective of FIG. 6.

FIG. 1 shows a schematic depiction of a filling device 10 for conveying, counting and analyzing items 12 and feeding the items 12 to a container, package or other receptacle. By way of example, the items may be solid dose tablets, gelcaps or capsules (e.g., of the pharmaceutical variety) and the filling device may be either intermittent or continuous type. The device 10 includes a bulk feeder 14 that deposits the items 12 to a conveyor 16, which aligns, singulates and spaces the items as they are moved to a drop point 18. The conveyor 16 may, for example, be a vibratory conveyor mechanism, as described in more detail below. As the items 12 fall along an item fall path (e.g., under gravity) they pass a sensor system 20, which counts the items as they pass so that an accurate and controlled fill count can be achieved. The sensor system 20 also analyzes the items for defects. In some cases, a reject mechanism 22 may be provided to move defective items to a reject path 24. For example, in the case of solid dose tablets, chipped tablets such as tablet 12' can be rejected. The reject mechanism could, for example, be a pressurized air unit the delivers a burst of pressurized air to move a defective item out of the item fall path and into the reject path 24. The reject mechanism could alternatively be a flap mechanism selectively movable into the item fall path to divert the item out of the item fall path by contact with the flap mechanism. In other implementations, item reject could occur further downstream in a system (e.g., by using a downstream reject mechanism 17 (e.g. blow nozzle or mechanical pusher) to move a receptacle containing a defective tablet out of the flow of a receptacle conveyance path 15 after the defective tablet is filled into the receptacle). Items 12 that are not rejected follow the fill path 26. A gate system 28 along the fill path 26 may be controlled as desired to achieve delivery of an appropriate item count to a drop chute 19 that feeds receptacles. In a typical filling device, the conveyor 16 may align the items 12 into multiple feed paths that feed the items to multiple drop points, each with a respective sensor system 20, reject mechanism 22 and gating system 28 that feed to a common drop chute 19.

Referring to FIGS. 2A-2C and 3-4, one embodiment of an end section 32 of a conveyor (e.g. a vibratory conveyor) is shown above a sensor assembly 30. Here, the vibratory conveyor is in the form of a plate structure 34 that is bent or otherwise formed to provide a plurality of channels, each of which defines a respective feed path 36, 38 for items 12. Here, two sets of feed paths 36 and 38 are provided, where feed paths 36 have distal ends 40 that are substantially aligned along a drop plane 42 and where feed paths 38 have distal ends 44 that are substantially aligned along a drop plane 46. Drop plane 46 is offset from the drop plane 42 in the feed direction of the conveyor, and the feed paths 36 and 38 are arranged side-by-side in an alternating manner to create a staggered drop arrangement. The staggered drop arrangement enables a higher density of drop paths along a given width dimension W. Here, sets of adjacent feed path pairs 36 and 38 are formed with a gap G between each set or pair. At the distal end of each feed path respective item fall paths begin, with each item fall path including a respective item sensor system positioned therealong for sensing items as they fall.

In this regard, the sensor assembly 30 includes a sensor housing 50 with infeed cover 51. The sensor housing 50 defines an internal sensor compartment 52. Here, the housing includes an upper part 54 and lower part 56 that engage each other to form the compartment 52 and to contain sensor components within the compartment. When the items 12 leave the feed paths 36, 38 they enter respective drop paths 58, 60 which pass through the sensor housing 50. In particular, each item fall path or drop path 58, 60 is defined in part by a respective wall formed as a cylindrical wall or cylinder 62, 64, including a plurality of cylindrical walls 62 aligned with the drop plane 42 and a plurality of cylindrical walls 64 aligned with the drop plane 46. Here, the drop planes 42, 44 align substantially with the rearward perimeter of the walls 62, 64 (here, the cylindrical wall portion that is furthest back along the item feed direction), but the cylindrical walls could be alternately positioned (e.g., slightly more forward in the feed direction (down in FIG. 4) or slightly more rearward in the feed direction (up in FIG. 4)). Each cylindrical wall may be formed by a glass cylinder that is captured between the upper and lower parts 54 and 56 of the housing 50. Sealing features (e.g., o-rings or other sealing material) may be provided between the cylinders and the housing parts, as the internal compartment 52 is also enclosed and partially defined by the cylindrical walls 62, 64.

Notably, mounted with the compartment 52 is a printed circuit board 82 that includes the sensor components and sensor control electronics. In particular, the printed circuit board 82 includes a top side 84, a bottom side 86 and openings 88, 90 extending from the top side to the bottom side. The openings 88, 90 align with respective cylindrical walls 62, 64 (e.g. with the cylinders 62, 64 passing through the respective openings 88 and 90 or positioned immediately above and adjacent the respective openings 88 and 90) and the printed circuit board (PCB) therefore facilitates mounting of groupings of plural emitters and detectors (e.g., LED emitters/transmitters and photodiode detectors/receivers) about the cylindrical walls and, thus, about each of the item fall paths for the purpose of sensing the items as they fall through the sensor assembly 30. Mount openings and/or posts are also provided in/on the PCB for engagement with mount openings and/or posts within the compartment. The lower housing part 56 can also include upwardly extending cylindrical walls 89, 91 that can fit within the PCB openings 88, 90 to help properly position the PCB 82.

Sets of emitters and detectors surround each item fall or drop path for item detection as it passes through the cylinders. The arrangement of the emitters and detectors could take on any suitable configuration, such as circular, oval, other curve or a multi-sided shape (e.g., a pentagon, hexagon, octagon, nonagon or decagon). In this regard, reference is made to FIGS. 6-9, where each of the eight item drop paths 58, 60 includes a corresponding surrounding sensor system. Each sensor system 104 is formed with emitters and detectors arranged in a decagon pattern surrounding the drop path. Each decagon pattern is achieved utilizing ten upright PCBs 106 mounted around each cylindrical wall 62, 64. The upright PCBs 106 may be electrical plug/socket connected to the primary PCB 82, which is arranged horizontally and includes the opening(s) 88, 90 through which the drop path(s) extend. Each PCB includes an alternating plurality of emitters 112 and detectors 114 that are face mounted to the upright PCB 106. Here, six emitters and six detectors are shown on each upright PCB, but the number could vary. The manner in which the emitters and detectors are mounted could also vary.

Regardless of the mount position, the emitters and detectors are selectively operated (e.g., by a controller) to both sense and evaluate items as they fall. For small items, such as solid dose tablets, the diameter of the drop path define by the cylinders 62, 64 may typically be on the order of 30-75 mm, but other variations are possible. In one embodiment, the emitters may be infrared LED emitters and the detectors photodiodes that detect infrared but not visible light, in order to reduce impact of ambient light sources in the operating environment. However, other light wavelengths could be used.

Figure 10A:
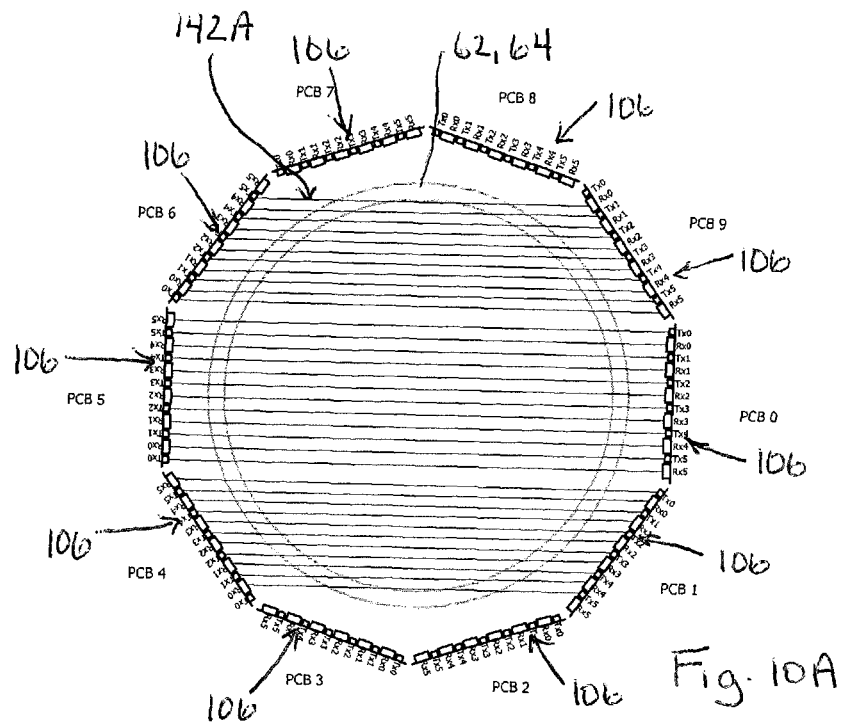
FIGS. 10A and 10B show top plan schematic views of emitters and detectors arranged about a cylinder.
Figure 10B:
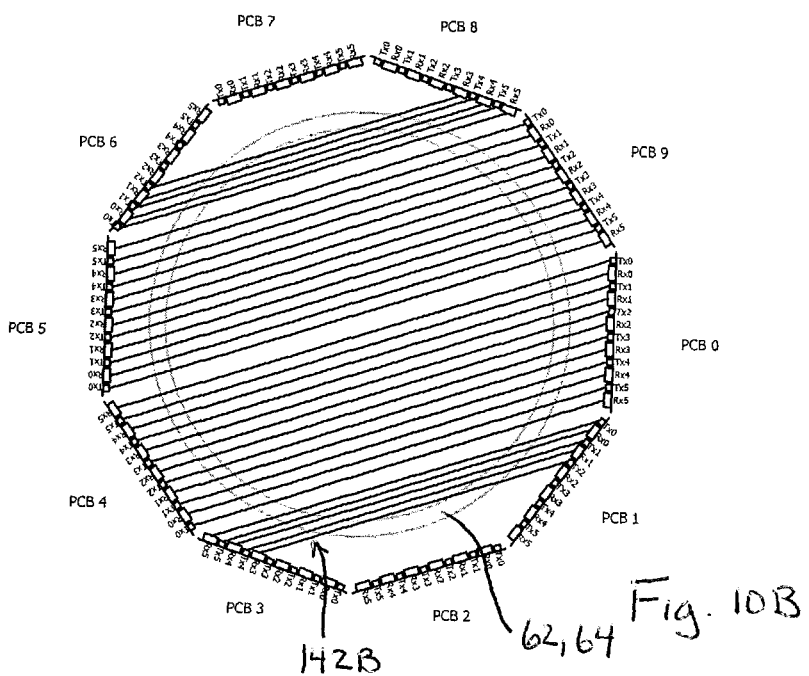

Controlled firing of the emitters 112 and monitoring of the detectors 114 can be used to establish multiple angularly offset active detection patterns, each made up of substantially parallel emitter to detector light paths or channels. Referring, to FIGS. 10A and 10B, two different active detection patterns 142A and 142B are shown, each made up of a set of substantially parallel emitter to detector light paths or channels. The pattern 142B is angularly offset from the pattern 142A (e.g., the substantially parallel emitter to detector light paths of pattern 142B are angularly rotated relative to those of the pattern 142A. By way of example, the illustrated rotation between the two patterns is eighteen degrees. Although not depicted in FIGS. 10A and 10B, the actually light paths or channels may be altered by refraction when passing through the cylindrical wall 62, 64. However, the refraction when the light passes through the wall to enter the drop path within the cylindrical wall will generally be opposite the refraction when the light passes through the cylindrical wall to leave the drop path within the cylindrical wall, and each light path will be linear when within the drop path internal of the cylinder.

Figure 11:
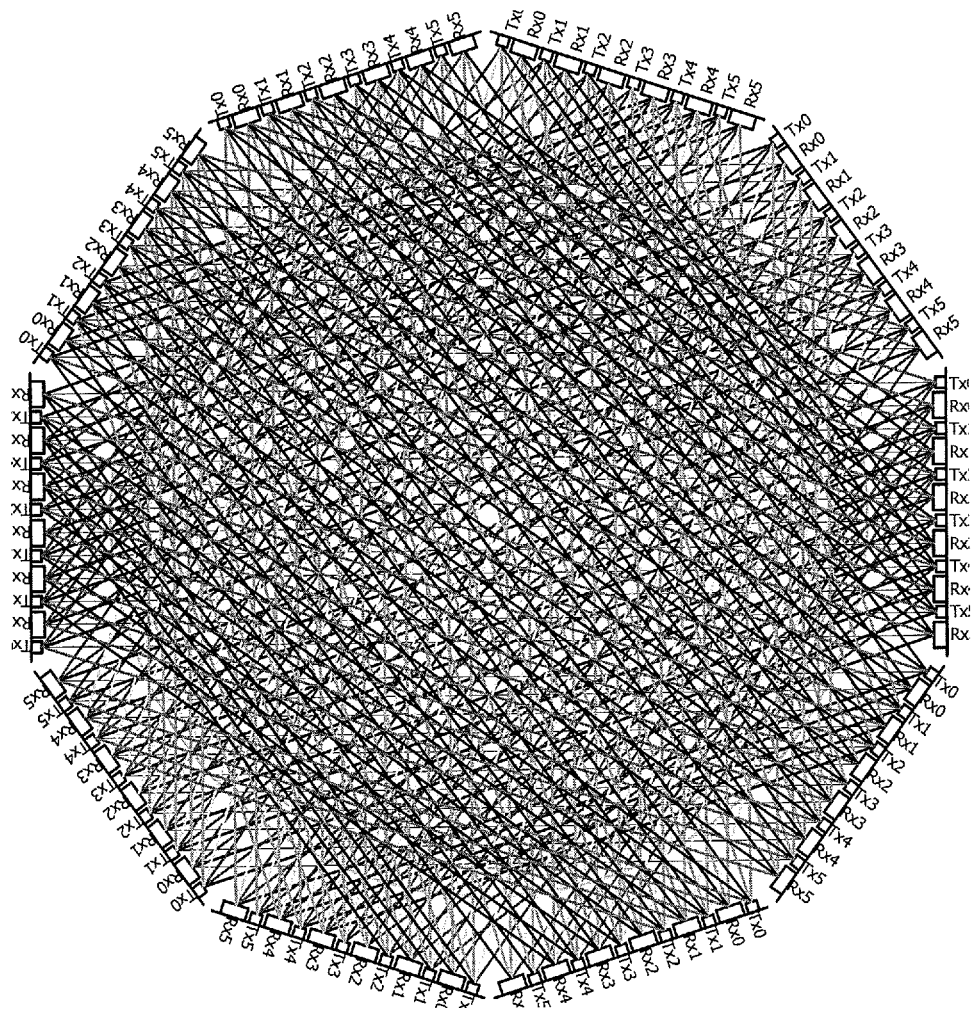
FIG. 11 shows a top plan schematic of emitters and detectors arranged about a cylinder, with numerous light path patterns shown in an overlapping manner.

Multiple addition sets of substantially parallel light paths or channels can be formed by controlled operation of the sensor system to achieve different pairings of emitters and detectors. By way of example with reference to FIG. 11, ten different active patterns are all shown overlapping each other, with eighteen degrees of rotation between sequential patterns. It is recognized that the number of active detection patterns used during item sensing could vary, with the angular offset between patterns also capable of variance from the illustrated eighteen degrees. By way of example, where four active patterns are set up, the patterns may be successively rotated by 45° relative to each other in order to assure that the total rotation as between all of the patterns covers a full 180°, or successive pattern rotation of 36° in the case of the use of five active patterns, or successive pattern rotation of 30° in the case of the use of six active patterns, or successive pattern rotation of 22.5° in the case of the use of eight active patterns, are all possibilities. The emitter to detector light paths may also referred to as emitter to detector optical paths herein.

Figure 12:
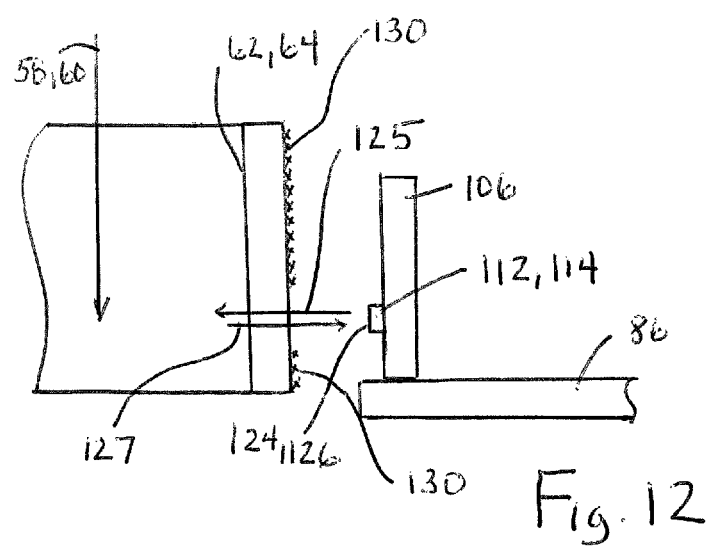
FIG. 12 is a schematic side elevation of a printed circuit board and cylinder demonstrating emitter and detector mounting.
Figure 13:
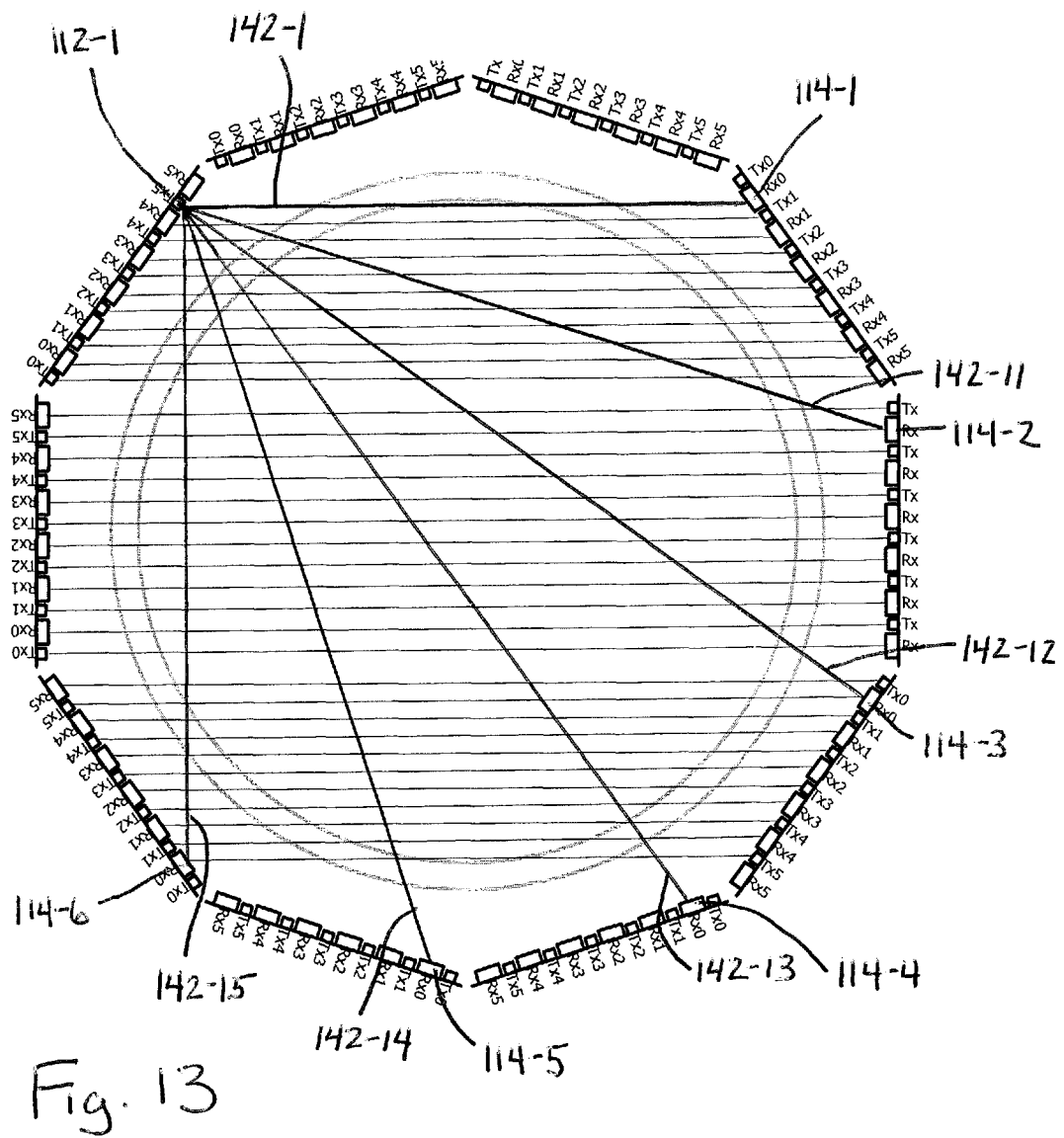
FIG. 13 shows a top plan schematic of emitters and detectors arranged about a cylinder, with numerous light path orientations shown.

Referring to FIG. 12, a schematic depiction of orientation of the emitters 112 and detectors 114 relative to the cylindrical walls is shown. The face 124 of the emitter body 112 directs light into and through the cylindrical wall 62, 64 into the item drop path 58, 60 per arrow 125, while the face 126 of the receiver body 114 receives light that passes from the item drop path 58, 60 and through the cylindrical wall 62, 64 per arrow 127. In some embodiments, an entirety of the height of the cylindrical wall 62, 64 may be transparent, but in other cases shielding could be present, such as a coating 130 on the external surface of the cylindrical wall in zones above and below the emitters and detectors In terms of establishing each active detection pattern, the emitter to detector light paths are activated and checked one at a time until all paths for a given active detection pattern have been activated and checked. Each emitter and each detector will be associated with a number of emitter to detector light paths that need to be checked, as suggested by the paths in FIG. 11. By way of example, as seen in FIG. 13, emitter 112-1 is used to check light paths 142-1, 142-11, 142-12, 114-13, 114-14 and 142-15 to each of detectors 114-1, 114-2, 114-3, 114-4, 114-5 and 114-6. In order to check each of these paths, emitter 112-1 is activated while all other emitters are off, and then each of the detectors (114-1, 114-2, 114-3, 114-4, 114-5 and 114-6) is checked one at a time to determine if light from the emitter is reaching the detector (e.g., meaning the light path is not occluded by a falling item) or not reaching the detector (meaning the light path is occluded by a falling item). The data regarding occlusion (e.g., indicated by the detector not outputting at least a set voltage level) or lack of occlusion (e.g., detector outputting at least the set voltage level) of each light path is buffered or otherwise stored in memory for use in evaluating the falling item. Once all necessary light paths for a given emitter have been checked, that emitter is turned OFF and a next emitter turned ON and then multiple detectors associated with that emitter are checked one at a time (i.e., corresponding to the light paths from the next emitter that are needed in order to set up and check each of the active detection patterns that will be used). This process continues until all of the emitter to detector light paths for all of the detection patterns have been set up and checked and the resulting occlusion data have been buffered or otherwise stored.

Figure 14A:
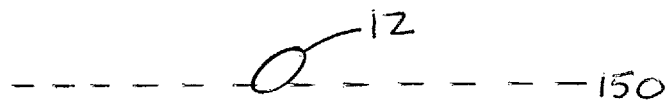
FIGS. 14A-14D show an exemplary fall sequence of an item through the detection plane of a sensor assembly.
Figure 14B:
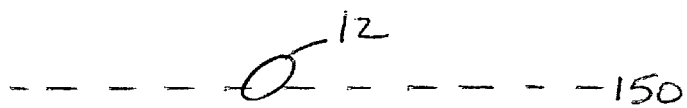
Figure 14C:
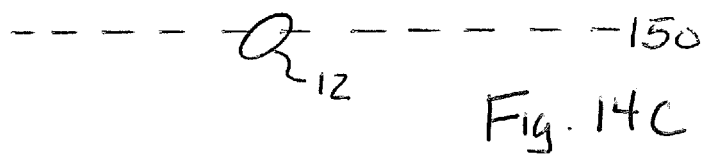
Figure 14D:
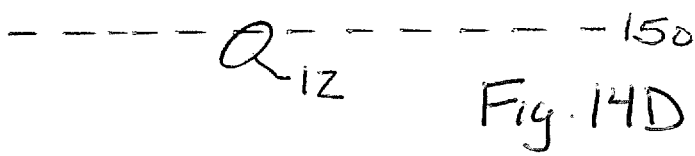

This process is then repeated multiple times so that pattern occlusion data is collected and stored multiple times for each falling item. For example, referring to the schematic of FIGS. 14A-14E, an exemplary item 12 is shown falling downward through a representative sensor assembly sensing plane 150 in which the active detection patterns are set up. Here, for the item position represented in FIG. 14A, the occlusion data for each of the ten detection patterns represented in FIG. 11 would be obtained a first time, for the item position represented in FIG. 14B, the occlusion data for each of the ten detection patterns would be obtained a second time, for the item position represented in FIG. 14C, the occlusion data for each of the ten detection patterns would be obtained a third time, and for the item position represented in FIG. 14D, the occlusion data for each of the ten detection patterns would be obtained a fourth time. Each collection of pattern occlusion data can be referred to as a pattern data slice, with multiple pattern data slices being taken for each falling item. While four pattern data slices are contemplated by the schematic of FIGS. 14A-14D, it is recognized that a lesser number of pattern data slices or, more typically, a larger number of pattern data slices (e.g., five or more) could be taken, it being understood that more pattern data slices will generally provide a more complete set of data for more accurate item evaluation.

Figure 15:
FIG. 15 is a side elevation of a falling item.
Figure 16A:
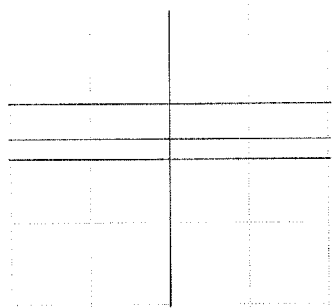
FIGS. 16A-16J show top plan schematic views of select occlusion data of differently oriented detection patterns sequentially overlaid on each other for assessing a falling item.
Figure 16B:
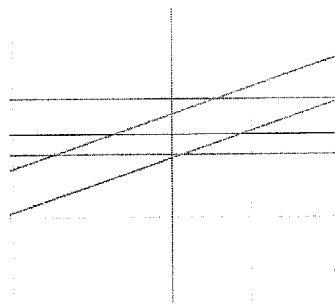
Figure 16C:
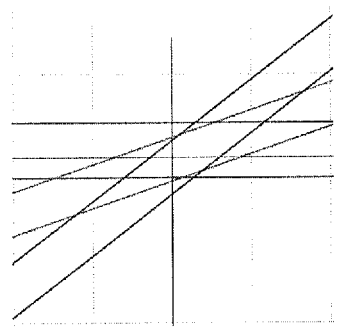
Figure 16D:
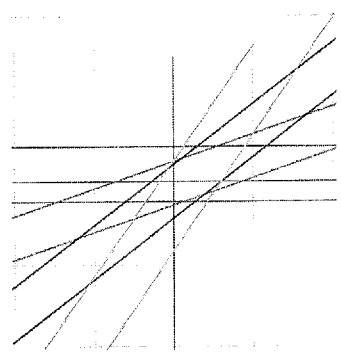
Figure 16E:
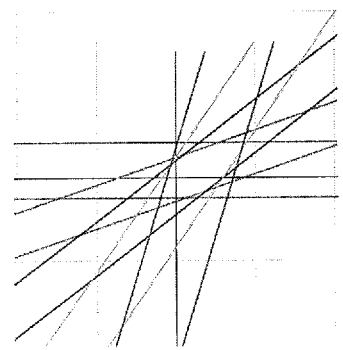
Figure 16F:
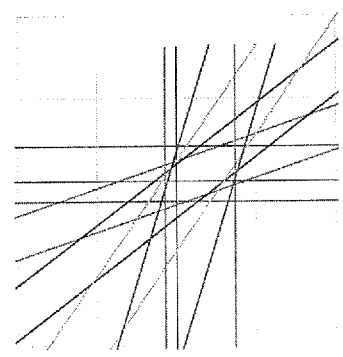
Figure 16G:
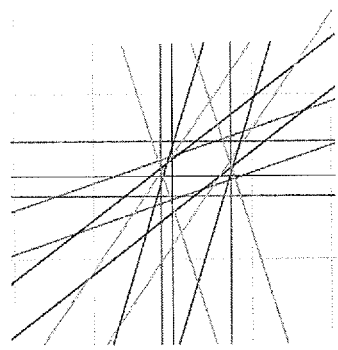
Figure 16H:
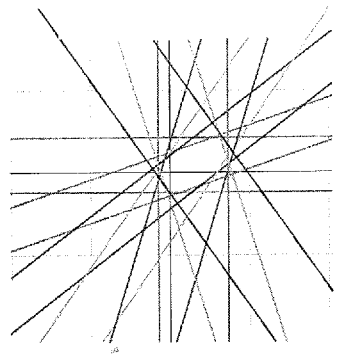
Figure 16I:
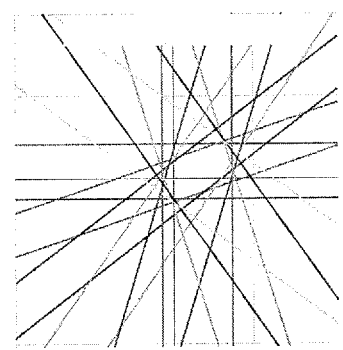
Figure 16J:
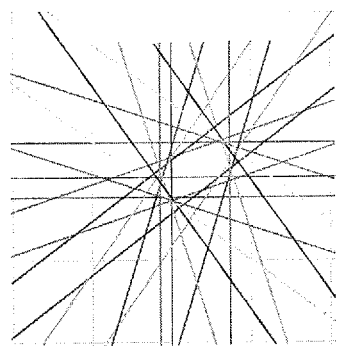

Because the item 12 is actually moving, it is recognized that each item position show in FIGS. 14A-14D is actually representative of a range of positions of the item during each pattern data slice collection process (i.e., during the time it takes for the first collection of occlusion data for the ten patterns the item will actually move downward slightly, and similarly for the second, third and fourth collections of pattern occlusion data). Thus, referring to FIG. 15 by way of example, occlusion data collection for a first pattern data slice could take place along zone 12a for a falling item, occlusion data collection for a second pattern data slice could take place along zone 12b, occlusion data collection for a third pattern data slice could take place along zone 12c, occlusion data collection for a fourth pattern data slice could take place along zone 12d and collusion data collection for a fifth pattern data slice could take place along zone 12e.

Referring again to FIG. 13, when energized, each LED emitter (e.g., 112-1) outputs light with a cone shaped dispersion pattern. The intensity of the light is greatest at the center of the pattern (e.g., greatest intensity along the path 142-13 from emitter 112-1 to detector 114-3) and lessens when moving towards the edges of the pattern (e.g., lower intensity along the path 142-13, even lower intensity along the path 142-14 and even further lower intensity along the path 142-15). In order to account for this variance and best assure that detectors are properly triggered (e.g., the detectors output at least a set voltage) when the path between the energized emitter and the detector is unblocked, the energization level of the emitter is varied depending upon which detector is being checked. So, for example, referring again to FIG. 13: when detector 114-2 or detector 114-4 is being checked, the applied power to emitter 112-1 is greater than when detector 114-3 is being checked, when detector 114-1 or 114-5 is being checked, the applied power to emitter 112-1 is greater than when detector 114-2 or 114-4 is being checked, and when detector 114-6 is being checked, the applied power to emitter 112-1 is greater than when detector 114-1 and 114-5 are being checked. This variance in applied power to the emitters during pattern set-up and checking acts to normalize the light intensity that is expected to be seen by each detector (assuming the path to the detector is unblocked), increasing system accuracy. The control logic may be set up to automatically recalibrate the normalization energization required on a periodic basis while no item is passing through the ring sensor, as will be described in further detail below.

As mentioned above, the sensor system is controlled to take multiple two dimensional pattern data slices of an item as if falls through the sensor ring. Each pattern data slice is evaluated to determine an approximate area for the item (e.g., area in the sensing plane) along the zone in which the pattern data slice is taken. The collective evaluation of the approximate area determined for each pattern data slice and understanding the rate of travel of the item as it falls enables a reasonable approximation of the volume of the item to be determined. That approximated volume can then be compared to an expected volume for the item to determine whether the item is good or defective (e.g., a full tablet or a chipped tablet). Moreover, the sensor system can also determine if the approximated volume is substantially twice the expected volume for the item, in which case the sensor system can successfully count double items (e.g., two tablets moving through the sensor assembly at the same time), which reduces the likelihood of overfilling. Other techniques for identifying the presence of two items falling simultaneously are described in more detail below.

Figure 17:
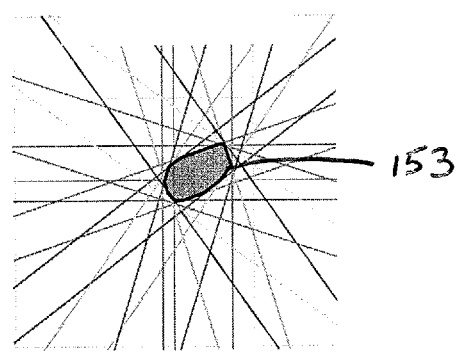
FIG. 17 shows a top plan schematic view of an approximated item perimeter determined for a detection data splice of an item.

With respect to area approximation for each pattern data slice, the occlusion data of each active detection pattern for the slice can, in one example, be mathematically layered together to achieve the area approximation. Referring to FIGS. 16A-16J, the occlusion data for the ten active detection patterns of a slice is shown progressively visually layered together to define a perimeter, per FIG. 17, that is used for area calculation. In this example, the occlusion data for each active detection pattern is represented by two emitter to detector optical paths of the pattern, more specifically, the two emitter to detector optical paths of the active detection pattern that are the laterally exterior occluded paths of a set of occluded paths in the pattern.

Figure 18A:
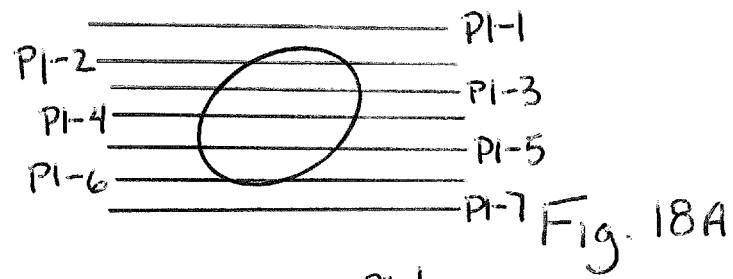
FIGS. 18A-18C show exemplary active detection patterns applied to an item.
Figure 18B:
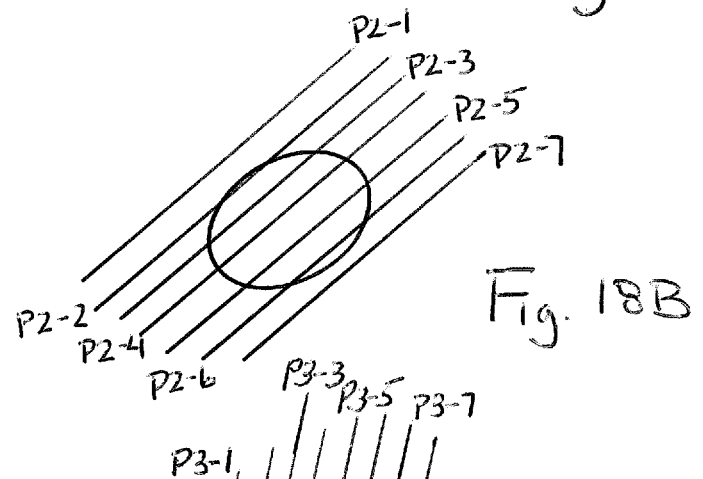
Figure 18C:
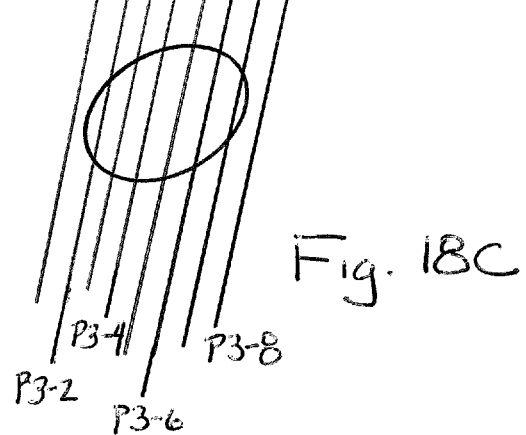

In general, a falling item will occlude a set of adjacent (side-by-side) emitter to detector paths of an active detection pattern. By way of example, FIG. 18A-18C show three partial detection patterns relative to a falling item 152. In FIG. 18A, emitter to detector paths P1-1, P1-2, P1-3, P1-4, P1-5, P1-6 and P1-7 are shown. Paths P1-2, P1-3, P1-4, P1-5 and P1-6 would be the occluded paths, and therefore the two extreme or exterior paths P1-2 and P1-6 would be selected as the paths of use in area approximation. In FIG. 18B, emitter to detector paths P2-1, P2-2, P2-3, P2-4, P2-5, P2-6 and P2-7 are shown. Paths P2-2, P2-3, P2-4, P2-5 and P2-6 would be the occluded paths, and therefore the two extreme or exterior paths P2-2 and P2-6 would be selected as the paths of use in area approximation. In FIG. 18C, emitter to detector paths P3-1, P3-2, P3-3, P3-4, P3-5, P3-6, P3-7 and P3-8 are shown. Paths P3-2, P3-3, P3-4, P3-5, P3-6 and P3-7 would be the occluded paths, and therefore the two extreme or exterior paths P3-2 and P3-7 would be selected as the paths of use in area approximation. The same selection process would be used for any other active detection patterns of a data slice (e.g., seven additional patterns in the example of FIGS. 16A-16J).

The collective selected emitter to detector light paths for each of the detection patterns for a pattern data slice (e.g., the paths shown in FIG. 16J) are then evaluated to determine whether any of the paths do not contribute information that is useful, or sufficiently useful, for approximating the perimeter of the falling item. Non-useful paths are discarded, and the remaining paths are used to define an approximated perimeter 153 of the falling item, as suggested in FIG. 17. Calculating an area based upon this approximated perimeter is then relatively straightforward. As suggested schematically in FIG. 19, multiple perimeter determined areas from multiple pattern slices 160A-160E etc. can be mathematically combined to determine an approximate volume for the falling item 152.

Figure 20:
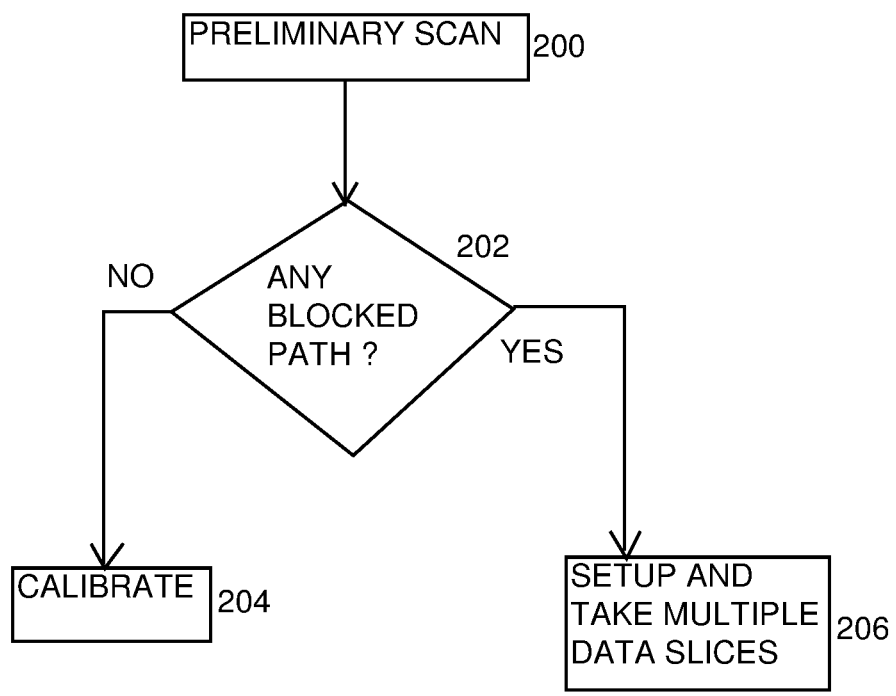
FIGS. 20-22 show algorithms corresponding to sensor assembly operation.
Figure 21:
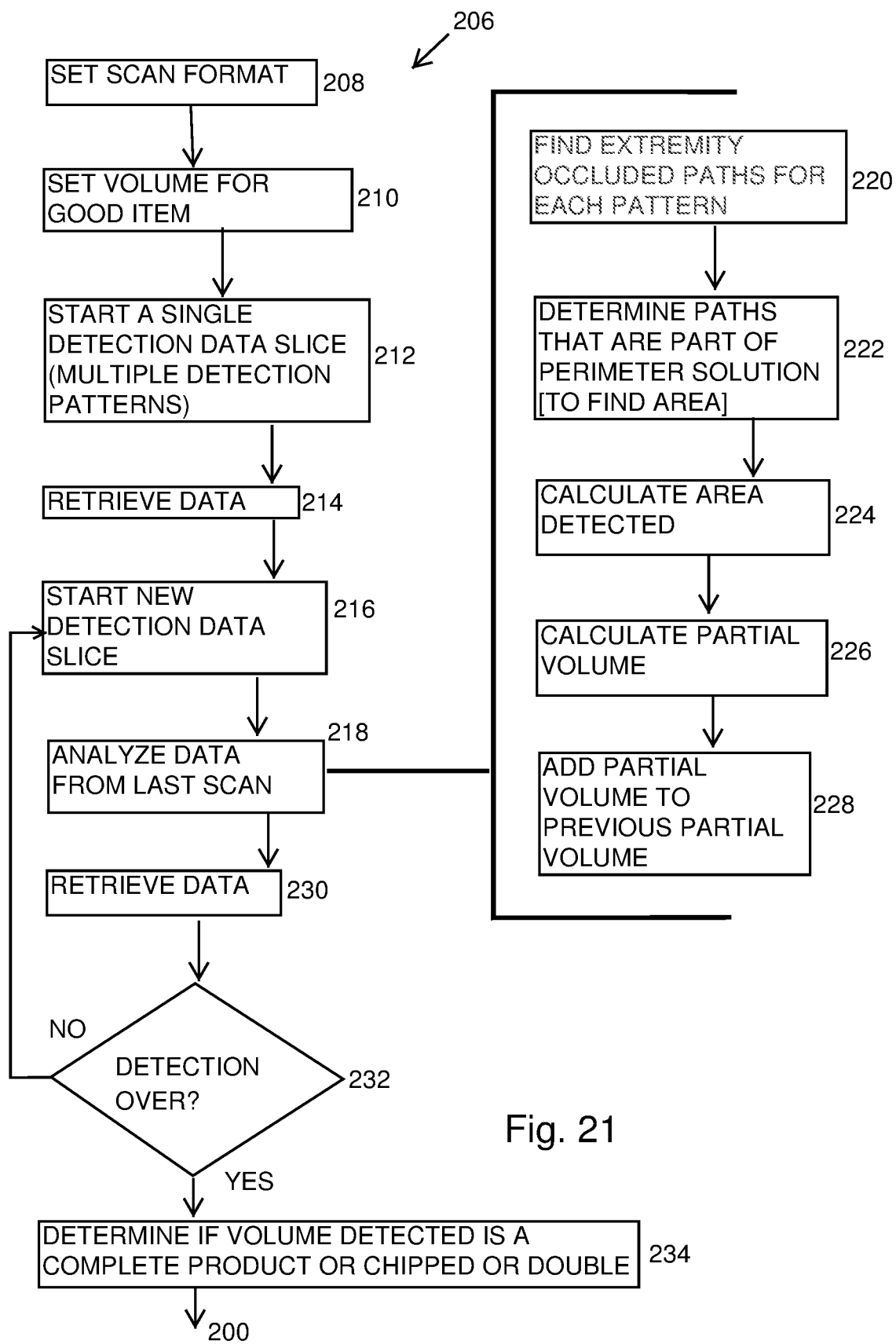
Figure 22:
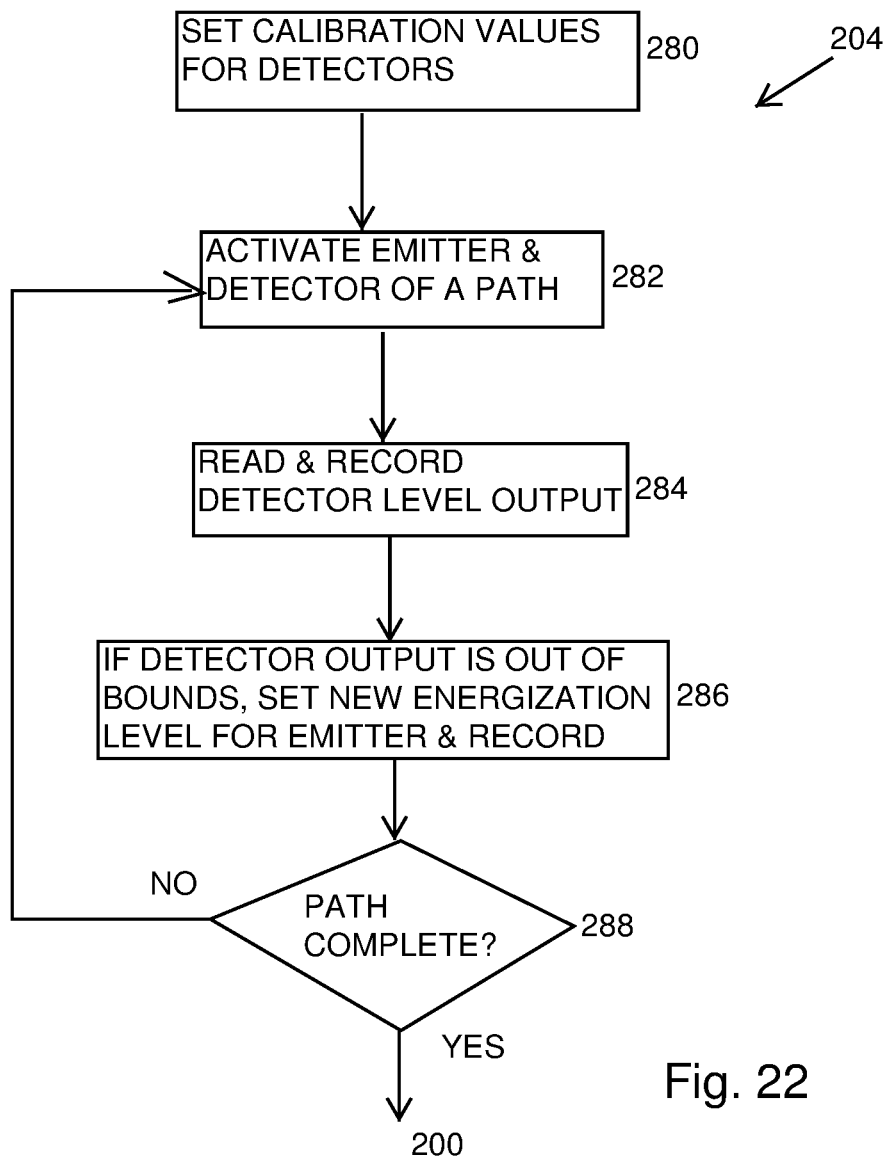
Figure 23:
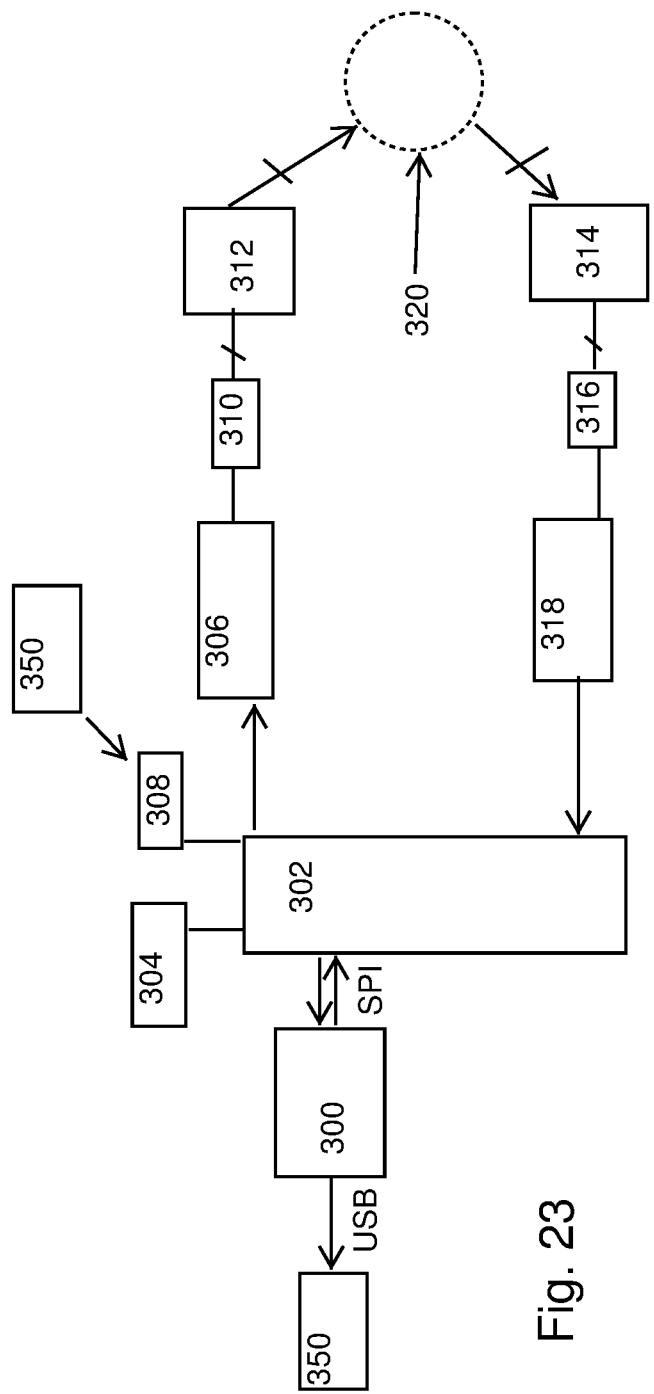
FIG. 23 shows one exemplary controller arrangement.

An exemplary scanning and analysis process is depicted by the flow charts in FIGS. 20-22. Per FIG. 20, a preliminary scan is made (e.g., setting up at least one of the detection patterns) at step 200 and at step 202 a determination is made as to whether any of the emitter to detector paths are occluded. If not, processing moves to a calibration phase 204, during which the emitter intensity levels can be set up. If the preliminary scan shows one or more pattern paths occluded, processing moves to an active scanning phase 206 during which multiple pattern data slices are taken.

FIG. 21 shows the scanning phase 206, which involves setting the scan format (e.g., set number of active patterns angularly rotated by eighteen degrees, or other desired pattern) at step 208. At step 210, setting an expected volume for a good item (e.g., by retrieving a stored volume for a known item type as determined by a previously carried out teaching sequence for the item). At step 212, the all emitter to detector light paths or channels necessary for the set number of active patterns are run by sequentially turning on emitters and checking detectors as described above and the occlusion data is stored. At step 214, the occlusion data retrieved (e.g., sent from a CPU system that controls the emitter to detector checking to a main CPU that analyses the occlusion data for are and volume approximating). At step 216, a next detection data slice for the falling item is initiated.

As indicated by step 218, with sub-steps 220-228, the occlusion data for the previous detection data slice can be analyzed while the next detection data slice capture is ongoing. This analysis may involve identifying and selecting the extreme or exterior occluded emitter to detector light paths for each pattern per step 220, and identifying which of the selected paths will be used for approximating the perimeter of the falling item per step 222. The area for that perimeter is calculated at step 224, and a partial volume for that area is calculated at step 226. This partial volume is then added to any previous partial volume per step 228.

Per steps 230 and 232, the detection data slice process and occlusion data analysis steps continue until complete (e.g., when the item is no longer detected in the scanning plane as indicated by no occluded paths). Once the detection data slice process is complete for the item, the determined volume (e.g., equal to the total of the cumulative partial volumes) is then checked at step 234 against the good item volume to in order to accept the item (e.g., if the selected approximate volume is within a certain percentage of the set good item volume) or to reject the item (e.g., if the selected approximate volume is not within the certain percentage of the set good item volume). The accept or reject designation may be used to determine the path the item follows as noted above in the discussion of FIG. 1. Step 234 could include the logic to determine if the selected volume is within a certain percentage of twice the set volume and, in such cases, to count two items instead of one item.

With respect to calculating the partial volume for each detection data slice (per step 226), because the vertical distance between the drop point of the vibratory conveyor 16 and the test or sensing plane of the emitter to detector paths is known, by taking into account known acceleration due to gravity, the speed and acceleration of the falling item during the pattern data slice can be used to determine the vertical travel distance between each detection data slice. For example, if the sensor scan for a first data detection slice is carried at time T0, the travel distance d0 of the item at that time is known (i.e., the item has just entered the sensing plane so the travel distance d0 is the known vertical distance between the end of the conveyor and the sensing plane of the sensor assembly). Therefore, fall time T0 can be calculated from the equation $d=\frac{1}{2}at^2$, where a=g (acceleration due to gravity), such that:

$$T0=((d0\times 2)/g)^{\frac{1}{2}}.$$

For a next sensor scan for a next data detection slice carried out at time T1, fall time T1 is determined as:

$$T1=T0+\text{time between } T0 \text{ scan and } T1 \text{ scan}.$$

The distance of the item from the end of the conveyor during the scan for that next detection data slice, d1, can therefore be calculate as:

$$d1=\frac{1}{2}g(T1)^2.$$

Thus, the travel distance between the two scans, say Td0, is determined as:

$$Td0=d1-d0.$$

Therefore, the partial volume V0 for the item based upon the approximated area of A0 of the item during the initial scan (first detection data slice) of the item can be determined as:

$$V0=A0\times Td0.$$

A similar process is used to determine the partial volume for each of the subsequent scans (i.e., each of the subsequent detection data slices) by determining the travel distance between each scan or detection data slice.

Of course, a variety of different approaches and algorithms can be taken to utilize the unique ring sensor detection data slice methodology to evaluate a falling item. The flow charts of FIGS. 18-20 show one exemplary approach.

FIG. 22 shows the calibration phase/mode steps 204 that are carried out when no item is passing through the sensor assembly. At step 280 the calibration value for the detectors is set (e.g., nominal detector output and threshold level output expected in the case of an unblocked path). At step 282 an emitter is energized at a set level and a single detector is activated (e.g., corresponding to a single emitter to detector light path). The detector output level is read and recorded at step 284. At step 286 the recorded detector output is compared to the calibration value and, if the recorded detector output is out of bounds (e.g., not within a specified percentage of the calibration value) a new energization level for the emitter during use of that specific emitter to detector light path is calculated (e.g., as expected to bring the detector output level in bounds, by raising energization level if the detector output was low and lowering the energization level if the detector output was high) and recorded for future use. Per step 288, steps 282 through 286 are repeated for all of the emitter to detector light paths of all detection patterns. This calibration phase, and the repetition of the same during normal machine operation, helps to assure accurate item evaluation over extended use by making adjustments as needed to account for both variations in emitter/detector performance and physical changes in operating conditions (e.g., dust accumulating on the glass cylinders).

The foregoing operational sequence can be carried out by any suitable control arrangement of the filling machine. As used herein the term "controller" is intended to encompass any circuit (e.g., solid state, application specific integrated circuit (ASIC), an electronic circuit, a combinational logic circuit, a field programmable gate array (FPGA)), processor(s) or microprocessor(s) (e.g., shared, dedicated, or group—including hardware or software that executes code), software, firmware and/or other components, or a combination of some or all of the above, that carries out the control functions.

In this regard, FIG. 21 is representative of one possible controller arrangement that includes a microcontroller 300, a field programmable gate array (FPGA) 302 with a reprogram interface 308, flash memory 304 as a data buffer, emitter multiplexer circuitry 306, emitter operational amplifier 310, detector operational amplifier 316 and detector multiplexer circuitry 318. A computer 350 can be used to push a desired algorithm and/or parameter data to the microcontroller 300, as well as to reprogram the FPGA 302 if desired. The microcontroller 300 delivers the scanning sequence to the FPGA 302 (e.g., per step 208 in FIG. 21). The FPGA logic carries out the steps to detection data slices and sends the occlusion data back to the microcontroller 300 for evaluation (e.g., per steps 218-228). The microcontroller 300 is also linked to the reject mechanism of the filling machine for control of the same. The multiplexer circuitry 306 enables a single emitter to be selected for energization at any given time, and the multiplexer circuitry 318 enables a single detector to be selected for checking at any given time (e.g., collectively defining the emitter to detector path that is being checked). The detector multiplexer also includes A/D converter circuitry to provide usable data back to the FPGA 302, which buffers all data for a given slice, and then pushes the buffered data to the microcontroller 300 for evaluation. Operational amplifiers 310 and 316 bring signal strengths to desired, functional levels. Representative emitter 312 and detector pair 314 are shown, along with a representative ring sensor assembly 320. Again, this controller arrangement is exemplary only, and other variations are possible.

Figure 26:
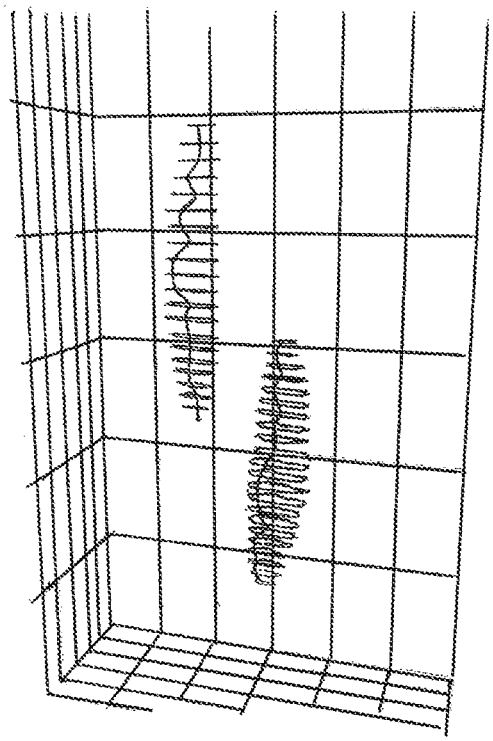
FIG. 26 shows simultaneous volume approximation for two falling items.

As mentioned above, the sensor system described herein can be used to identify if two items are falling simultaneously through the sensor plane of the sensor system. By way of example, FIG. 24 demonstrates that the occlusion data of a detection data splice can be used to identify the approximate perimeters of each of two paced apart items in the sensing plane at the same time. The controller is configured to identify that more than one item is falling through the detection plane based upon identification of the presence of both a first set of occluded and adjacent emitter to detector light paths and a second set of occluded and adjacent emitter to detector light paths being present in one or more of the active detection patterns used for a detection data splice, where at least one unbroken emitter to detector light path exists between the first set of occluded and adjacent emitter to detector light paths and the second set of occluded and adjacent emitter to detector light paths, e.g., as suggested by FIG. 25, where a set of three unobstructed/unbroken emitter to detector light paths 260 is located between two sets 262 and 264 of occluded emitter to detector light paths. FIG. 26 demonstrates that, in such instances, separate volume calculations can be performed for each of the items as they fall through the detection plane.

It is to be clearly understood that the above description is intended by way of illustration and example only, is not intended to be taken by way of limitation, and that other changes and modifications are possible.

Thus, in the illustrated embodiment, eight item drop paths are contemplated, where a single printed circuit board includes eight corresponding openings. However, a different number of drop paths could be provided. In addition, multiple printed circuit boards could be used (e.g., 2 PCBs each with four openings, four PCBs each with two openings, or eight PCBs each with one opening). PCBs of different shapes could also be used (e.g., not rectangular, such as a long s-shape in which opposite ends are at least partly offset laterally from each other in a side-to-side direction).

The manner in which the cylinders 62, 64 are assembled/mounted in the compartment could also vary. For example, each cylinder could include an upper metal rim engaged with a top of the cylinder and a lower metal rim engaged with a bottom of the cylinder. Each upper metal rim could be threadedly engaged within a respective opening in a top wall of the upper housing part 54 and each lower metal rim could be threadedly engaged within a respective opening in a bottom wall of the lower housing part 56.

As mentioned above, the emitters and detectors could be mounted in different ways that do not involve or require the use of the upright printed circuit board 106. For example, as shown in FIG. 27, each opening 88, 90 in the PCB may be adapted for mounting of the emitters and detectors by configuring the CB edge portion that defines each opening with sequence of alternating steps 100 and recesses 102 for receiving body portions of the emitters and detectors (e.g., emitters aligned with and positioned in recesses 100 and detectors aligned with and positioned on steps 102 to form edge mounted emitters and detectors). In such an embodiment, the emitters and detectors could include one lead that attached to the top of the PCB and one lead that attaches to the bottom of the PCB. The emitters and detectors could alternatively be mounted on the top side or bottom side of the PCB. In such cases, optical fibers might be used to direct the emitted light along the desired path through the cylindrical wall 62, 64 and, similarly, to receive light and direct it to the detectors. Accordingly, one end of an optical fiber that emits light generated by an LED at the other end of the optical fiber can be considered part of the emitter as that term is used herein, and one end of another optical fiber that receives light and carries it to a photodiode at the other end of the optical fiber can be considered part of the detector as that term is used herein.

Although emitters and detectors that are disposed around a cylindrical wall are primarily described above, it is possible that in some systems the cylindrical wall could be eliminated.

Moreover, the sensor compartment could incorporate cooling technology as needed (e.g., compartment heat dissipated in a conductive manner, such as by a heat sink adjacent the housing, or an air circulation with air exchange with a clean air source, such as internal machine cabinet).

Figure 28:
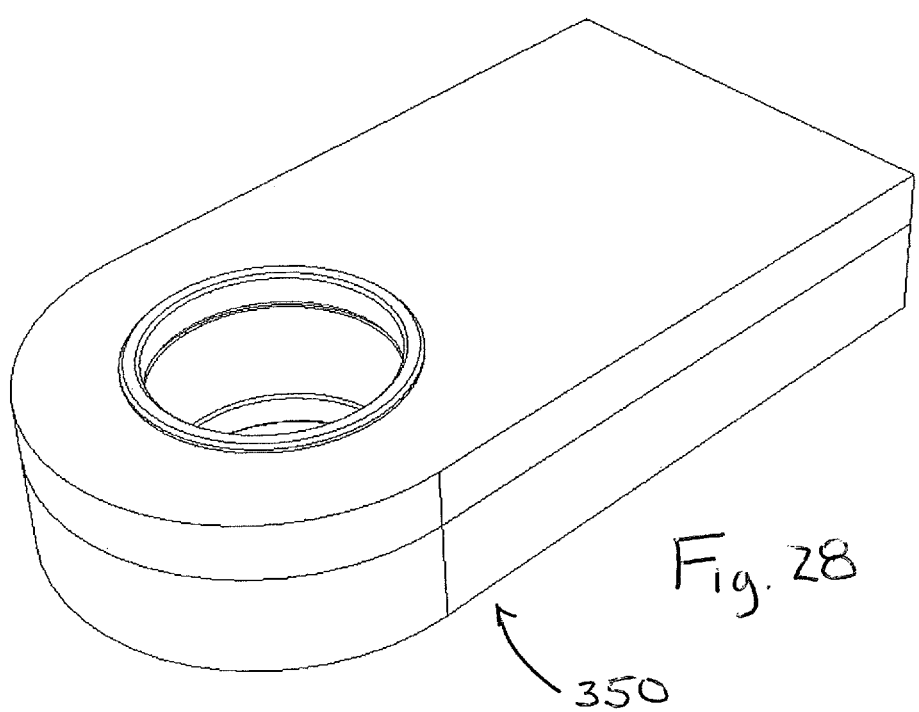
FIG. 28 shows an alternative sensor compartment configuration with a single item drop path therethrough.

While the above described sensor compartment contemplates multiple sensor rings for multiple corresponding item fall paths, it is recognized that other solutions might utilize multiple sensor compartments, each with a single sensor ring, such as the sensor assembly 350 shown in FIG. 28. Still other variations are possible.

Although a vibratory conveyor is primarily described above to feed items to the sensor, other types of feed mechanisms could be used, such as a moving conveyor belt, a sliding plate, a tube or a bowl.

Figure 24:
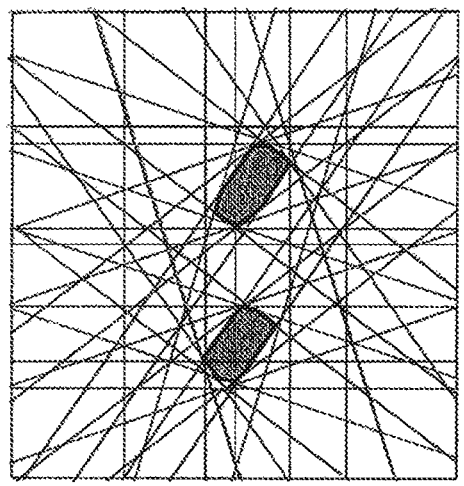
FIG. 24 shows a depiction of multiple item detection.
Figure 25:
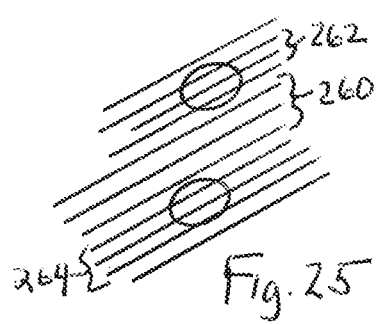
FIG. 25 shows unobstructed emitter to detector paths between two items.
Figure 29:
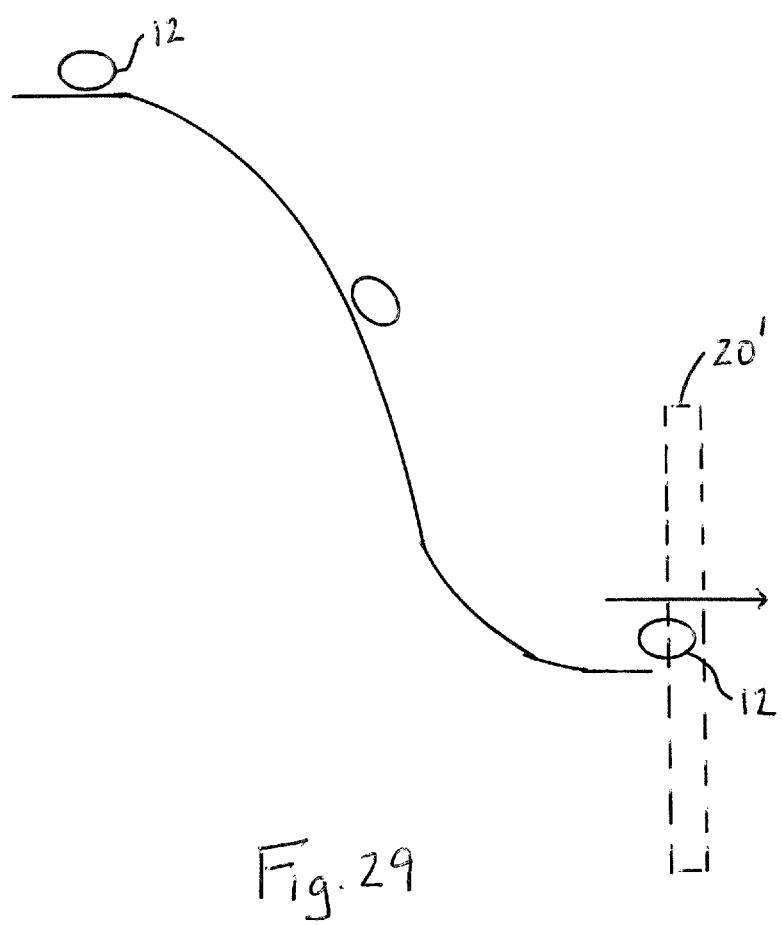
FIG. 29 shows an alternative orientation of a sensor assembly and item movement path.

Although the above description focuses primarily on an arrangement in which items move downward along a fall path through the sensor assembly, with the sensor assembly setting up the detection patterns in a substantially horizontal plane, it is recognized that other orientations are possible. For example, FIG. 29 contemplates an arrangement in which items 12 slide down a curved feed path 250 and then launch substantially horizontally through a sensor assembly 20'. Items could also be accelerated horizontally through such a sensor assembly 20' by other means, such as an air flow, or could even be moved at known velocity through the sensor assembly 20' by a transparent conveyor unit. In the configuration of FIG. 24, the detection patterns would be set up in a substantially vertical plane. Of course, other orientations of the sensor assemblies (e.g., where the detection patterns are set up at an angle offset from both vertical and horizontal) are possible as well, as needed to match the trajectory of items moving along a particular item movement path. Thus, an item fall path is just one example of an item movement path.

Although the above description focuses on active detection patterns that have emitter to detector paths that are substantially parallel, in some cases active detection patterns could have paths that crisscross each other or some paths that are otherwise not substantially parallel emitter to detector paths.

Figure 30:
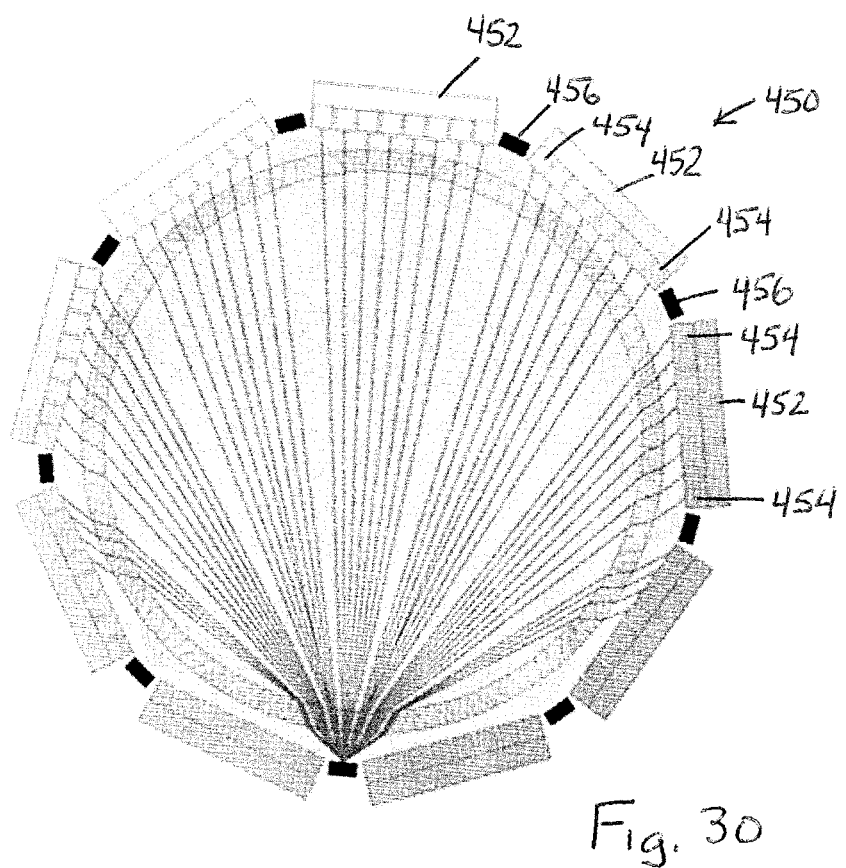
FIG. 30 shows another system variation in which the emitters are placed between groups of detectors.

In this regard, reference is made to FIG. 30 showing a sensing system 450 in which the emitter to detector paths that are set up for the formation of active detection patterns are not substantially parallel. System 450 demonstrates that the arrangement of emitters and detectors does not have be a one-to-one alternating pattern. Here, the upright PCBs 452 carry detectors 454 (here numbering eight detectors 454 on each upright PCB 452) and emitters 456 are arranged in gaps between the upright PCBs.

Other variations and modifications are also possible.

What is claimed is:

1. A sensor system for evaluating an item as it moves, comprising:
   a sensor assembly including a plurality of emitters and a plurality of detectors disposed about an item movement path;
   a controller configured for selectively operating the sensor assembly to set up a first active detection pattern through the item movement path by sequentially and rapidly checking an occlusion status of each of a first plurality of emitter to detector light paths that make up the first active detection pattern, such that only one emitter to detector light path of the first plurality of emitter to detector light paths is checked for occlusion at a given instance.

2. The sensor system of claim 1, wherein the controller is configured to set up a second active detection pattern through the item movement path by sequentially and rapidly checking an occlusion status of each of a second plurality of emitter to detector light paths that make up the second active detection pattern, such that only one emitter to detector light path of the second plurality of emitter to detector light paths is checked for occlusion at a given instance, wherein the second active detection pattern is angularly rotated relative to the first active detection pattern.

3. The sensor system of claim 2, wherein the controller is further configured to:
   set up a third active detection pattern through the item movement path by sequentially and rapidly checking an occlusion status of each of a third plurality of emitter to detector light paths that make up the third active detection pattern, such that only one emitter to detector light path of the third plurality of emitter to detector light paths is checked for occlusion at a given instance, wherein the third active detection pattern is angularly rotated relative to both the first active detection pattern and the second active detection pattern;
   set up a fourth active detection pattern through the item movement path by sequentially and rapidly checking an occlusion status of each of a fourth plurality of emitter to detector light paths that make up the fourth active detection pattern, such that only one emitter to detector light path of the fourth plurality of emitter to detector light paths is checked for occlusion at a given instance, wherein the fourth active detection pattern is angularly rotated relative to each of the first active detection pattern, the second active detection pattern and the third active detection pattern.

4. The sensor system of claim 1, wherein:
   the first plurality of emitter to detector light paths comprises a first set of substantially parallel emitter to detector light paths;
   the second plurality of emitter to detector light paths comprises a second set of substantially parallel emitter to detector light paths, the second set of substantially parallel emitter to detector light paths is angularly rotated relative to the first set of substantially parallel emitter to detector light paths;
   the third plurality of emitter to detector light paths comprises a third set of substantially parallel emitter to detector light paths, the third set of substantially parallel emitter to detector light paths is angularly rotated relative to both the first set of substantially parallel emitter to detector light paths and the second set of substantially parallel emitter to detector light paths;
   the fourth plurality of emitter to detector light paths comprises a fourth set of substantially parallel emitter to detector light paths, the fourth set of substantially parallel emitter to detector light paths is angularly rotated relative to each of the first set of substantially parallel emitter to detector light paths, the second set of substantially parallel emitter to detector light paths and the third set of substantially parallel emitter to detector light paths.

5. The sensor system of claim 4, wherein the controller is configured to repeatedly set up and capture occlusion data for at least the first, second, third and fourth active detection patterns as the item moves in order to establish multiple data capture slices for the item, each data capture slice corresponding to a respective position or zone along a dimension of the item that runs parallel to a direction of movement of the item.

6. The sensor system of claim 5, wherein the controller is configured to utilize data from the multiple data capture slices to calculate an approximate volume of the item, wherein the controller is configured to compare the approximate volume to an expected volume and to identify the item for rejection if the approximate volume is not within an acceptable range of the expected volume.

7. The sensor system of claim 4, wherein the controller is configured to evaluate occlusion data from at least the first, second, third and fourth active detection patterns in order to identify whether two spaced apart items are moving through a sensing plane of the sensor assembly simultaneously.

8. The sensor system of claim 2, wherein:
   the first plurality of emitter to detector light paths comprises a first set of substantially parallel emitter to detector light paths;

the second plurality of emitter to detector light paths comprises a second set of substantially parallel emitter to detector light paths, the second set of substantially parallel emitter to detector light paths is angularly rotated relative to the first set of substantially parallel emitter to detector light paths;

wherein the controller is configured to evaluate both the first active detection pattern and the second active detection pattern to identify whether more than one item is falling through a detection plane of the sensor assembly at the same time.

9. The sensor system of claim 8, wherein the controller is configured to identify that more than one item is falling through the detection plane based upon identification of the presence of both a first set of occluded and adjacent emitter to detector light paths and a second set of occluded and adjacent emitter to detector light paths being present in at least one of the first active detection pattern or the second active detection pattern, wherein at least one unbroken emitter to detector light path exists between the first set of occluded and adjacent emitter to detector light paths and the second set of occluded and adjacent emitter to detector light paths.

10. The sensor system of claim 1, wherein the first active detection pattern includes (i) a first emitter to detector light path from a first emitter of the plurality of emitters to a first detector to the plurality of detectors and (ii) a second emitter to detector light path from the first emitter to a second detector of the plurality of detectors, wherein the first emitter is activated at a first intensity level when checking the first emitter to detector light path and the first emitter is activated at a second intensity level when checking the second emitter to detector light path, wherein the first detector is positioned angularly closer to the first emitter around a perimeter of the item movement path than is the second detector, and the first intensity level is greater than the second intensity level.

11. The sensor system of claim 1, further comprising:
a printed circuit board including an opening through which the item movement path extends, wherein the plurality of emitters and the plurality of detectors are mounted about the opening in the printed circuit board.

12. The sensor system of claim 11, wherein the printed circuit board is a main circuit board, the system further includes a plurality of upright printed circuit boards arranged around the opening, and each upright printed circuit board includes multiple emitters of the plurality of emitters mounted thereon and multiple detectors of the plurality of detectors mounted thereon.

13. The sensor system of claim 1, wherein the controller is configured for selectively operating the sensor assembly in a calibration mode when no item is within a sense zone of the sensor assembly, wherein, in the calibration mode, for at least a first emitter to detector light path, the controller is configured to:
(a) activate the emitter of the first emitter to detector light path at a set intensity level and check the detector of the first emitter to detector light path for a detector signal strength and, if the detector signal strength is outside of a predefined signal strength range, adjust the set intensity level in a manner expected to bring detector signal strength within the predefined signal strength range, wherein the set intensity level as adjusted is utilized to activate the detector a next time the first emitter to detector light path is evaluated.

14. The sensor system of claim 13 wherein the controller is configured to carry out step (a) for multiple additional emitter to detector light paths during the calibration mode.

15. A filling machine including the sensor system of claim 1, further comprising:
an item reject mechanism for selectively removing the item identified for rejection, wherein the item reject mechanism is a nozzle or pusher for moving a receptacle that receives the item identified for rejection out of a receptacle flow path after the item has been filled into the receptacle.

16. A filling machine including the sensor system of claim 1, wherein the filling machine includes an item feed path with a distal end positioned above the item movement path, wherein the item movement path is vertically downward through a transparent or translucent cylinder, and the plurality of emitters and the plurality of detectors are arranged around the cylinder.

17. A filling machine including the sensor system of claim 1, further comprising:
an item reject mechanism for selectively removing the item identified for rejection, wherein the item rejection mechanism is one of:
a nozzle for selectively delivering a burst of fluid to move the item out of the item movement path,
or
a flap mechanism selectively movable into the item movement path to divert the item out of the item movement path by contact with the flap mechanism.

18. A sensor system for evaluating falling items, comprising:
a sensor assembly including a plurality of emitters and a plurality of detectors disposed about an item drop path, wherein the plurality of emitters comprises at least forty emitters and the plurality of detectors comprises at least forty detectors, wherein the plurality of emitters and the plurality of detectors are arranged in an alternating sequence about the item drop path,
a controller configured for selectively operating the sensor assembly to capture an emitter to detector path occlusion data slice for an item as it falls through the drop path, wherein the emitter to detector path occlusion data slice is captured by:
establishing a first active detection pattern through the item movement path by sequentially and rapidly checking an occlusion status of each of a first plurality of substantially parallel emitter to detector light paths that make up the first active detection pattern;
establishing a second active detection pattern through the item movement path by sequentially and rapidly checking an occlusion status of each of a second plurality of substantially parallel emitter to detector light paths that make up the second active detection pattern, wherein the second active detection pattern is angularly rotated relative to the first active detection pattern;
wherein the controller is configured to evaluate both the first active detection pattern and the second active detection pattern to identify whether more than one item is falling through a detection plane of the sensor assembly at the same time.

19. The sensor system of claim 18, wherein the controller is configured to identify that more than one item is falling through the detection plane based upon identification of the presence of both a first set of occluded and adjacent emitter to detector light paths and a second set of occluded and adjacent emitter to detector light paths being present in at least one of the first active detection pattern or the second active detection pattern, wherein at least one unbroken emitter to detector light path exists between the first set of occluded and adjacent emitter to detector light paths and the second set of occluded and adjacent emitter to detector light paths.

20. A filling device for filling receptacles with a plurality of items, comprising:
  an item conveyor including a plurality of item feed paths arranged above a corresponding plurality of item drop paths, wherein each item feed path includes a distal end at which items drop from the item feed path into an aligned one of the item drop paths;
  wherein each item drop path includes a respective item sensor system positioned therealong for sensing falling items;
  wherein the plurality of item feed paths include a plurality of first item feed paths and a plurality of second item feed paths, wherein the plurality of first item feed paths have distal ends that are substantially aligned along a first drop plane, wherein the plurality of second item feed paths have distal ends that are substantially aligned along a second drop plane, wherein the second drop plane is offset from the first drop plane, wherein the plurality of first item feed paths and the plurality of second item feed paths are arranged in an alternating sequence across a width of the conveyor.

21. The filling device of claim 20 wherein each item drop path is defined in part by a respective cylindrical wall, including a plurality of first cylindrical walls aligned with the first drop plane and a plurality of second cylindrical walls aligned with the second drop plane.

22. The filling device of claim 21 wherein each cylindrical wall is bounded by a respective plurality of emitters and detectors of the respective item sensor system, wherein each cylindrical wall is transparent, or at least translucent to a light wavelength output by the emitters, at least along a portion of a height of the cylindrical wall that aligns with the plurality of emitters and detectors.

* * * * *